(12) United States Patent
Okubo

(10) Patent No.: US 8,792,047 B2
(45) Date of Patent: Jul. 29, 2014

(54) ZOOM LENS AND IMAGE PICKUP APPARATUS INCLUDING THE SAME

(71) Applicant: Canon Kabushiki Kaisha, Tokyo (JP)

(72) Inventor: Yosuke Okubo, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/793,355

(22) Filed: Mar. 11, 2013

(65) Prior Publication Data

US 2013/0242169 A1 Sep. 19, 2013

(30) Foreign Application Priority Data

Mar. 15, 2012 (JP) ................................. 2012-058490

(51) Int. Cl.
*H04N 5/232* (2006.01)
*H04N 5/262* (2006.01)
*G02B 15/14* (2006.01)

(52) U.S. Cl.
USPC .......................... 348/345; 348/240.3; 359/686

(58) Field of Classification Search
None
See application file for complete search history.

(56) References Cited

U.S. PATENT DOCUMENTS

| | | | |
|---|---|---|---|
| 6,710,934 B2 * | 3/2004 | Park ............................... | 359/689 |
| 7,593,164 B2 | 9/2009 | Souma | |
| 7,830,613 B2 | 11/2010 | Ichikawa | |
| 7,965,452 B2 * | 6/2011 | Li et al. .......................... | 359/687 |
| 7,995,286 B2 * | 8/2011 | Kimura .......................... | 359/687 |
| 8,212,913 B2 * | 7/2012 | Yoshitsugu et al. .......... | 348/335 |
| 8,441,557 B2 * | 5/2013 | Anzawa et al. ............. | 348/240.3 |

* cited by examiner

*Primary Examiner* — Luong T Nguyen
(74) *Attorney, Agent, or Firm* — Canon USA Inc IP Divison

(57) ABSTRACT

A zoom lens includes, in order from an object side to an image side, first and third lens units having a positive refractive power, a second lens unit having a negative refractive power, and a rear lens group. The first lens unit is closer to the object side at a telephoto end than at a wide angle end. The second lens unit is closer to the image side at the telephoto end than at the wide angle end. A distance between the second lens unit and the third lens unit at the telephoto end, focal lengths at the wide angle end and the telephoto end, respectively, a focal length of the second lens unit, and an amount of movement of the second lens unit in an optical axis direction during zooming from the wide angle end to the telephoto end are appropriately set.

14 Claims, 33 Drawing Sheets

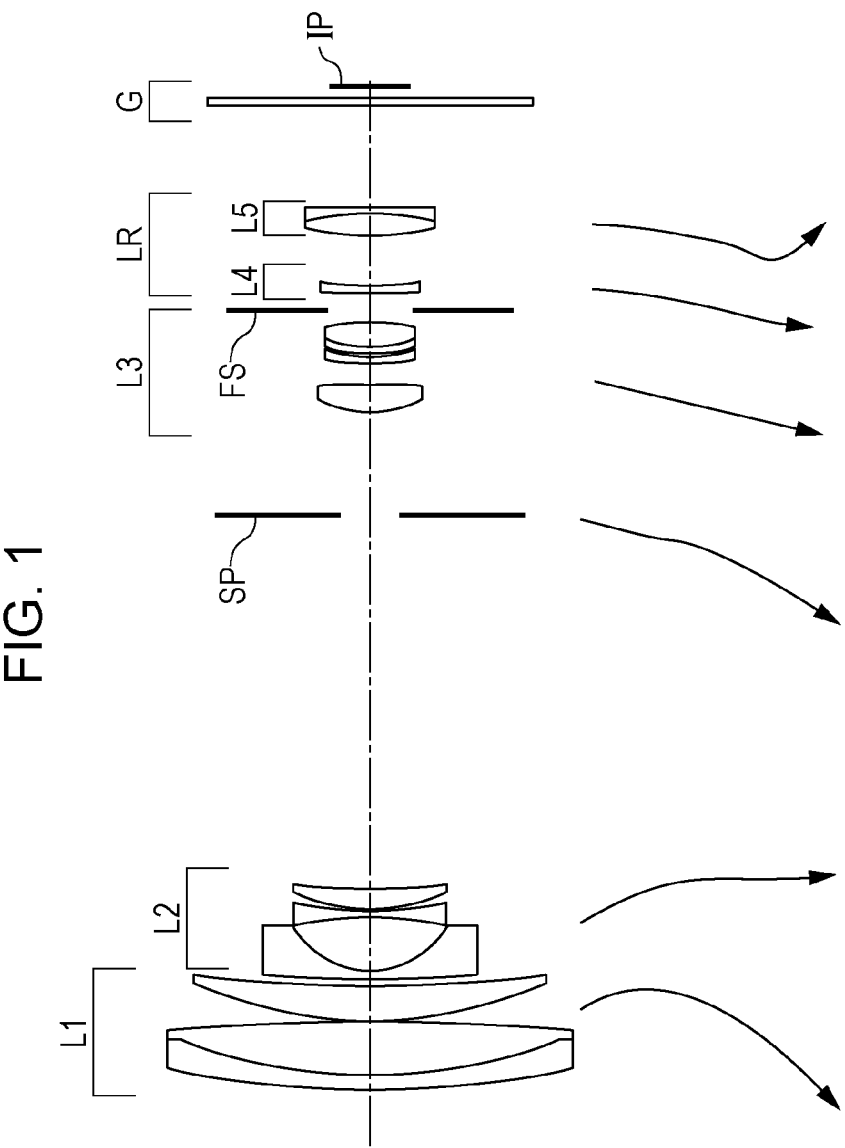

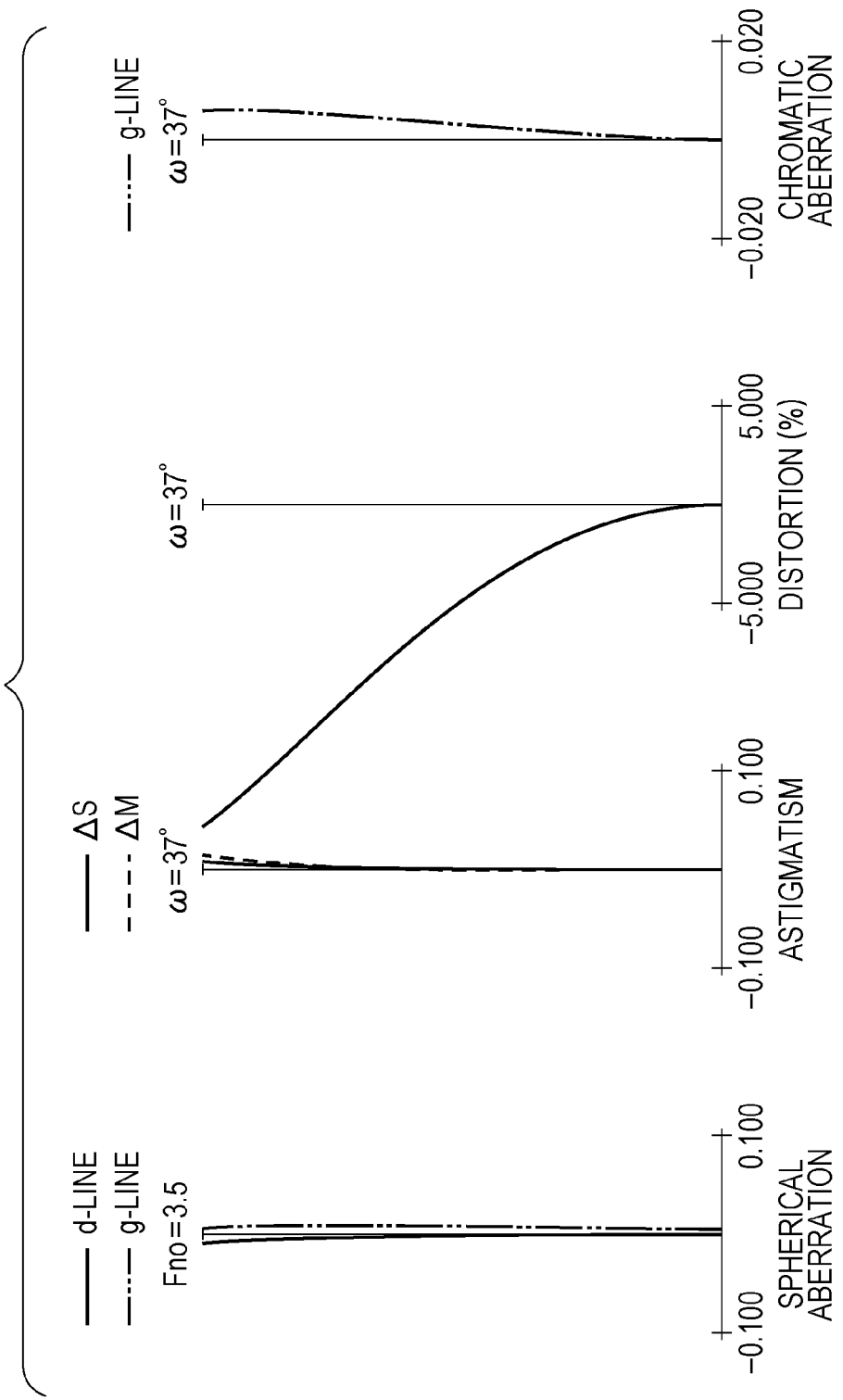

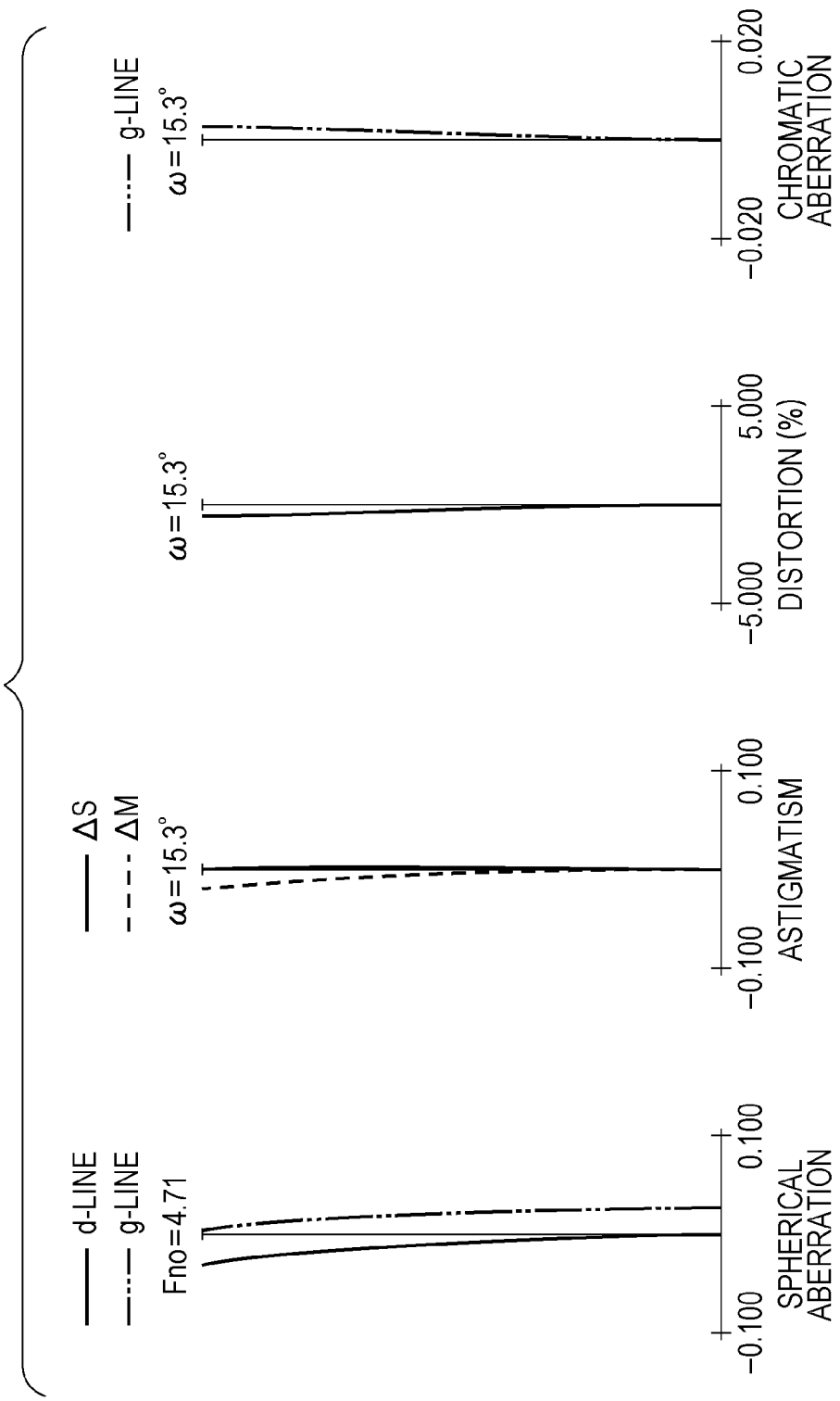

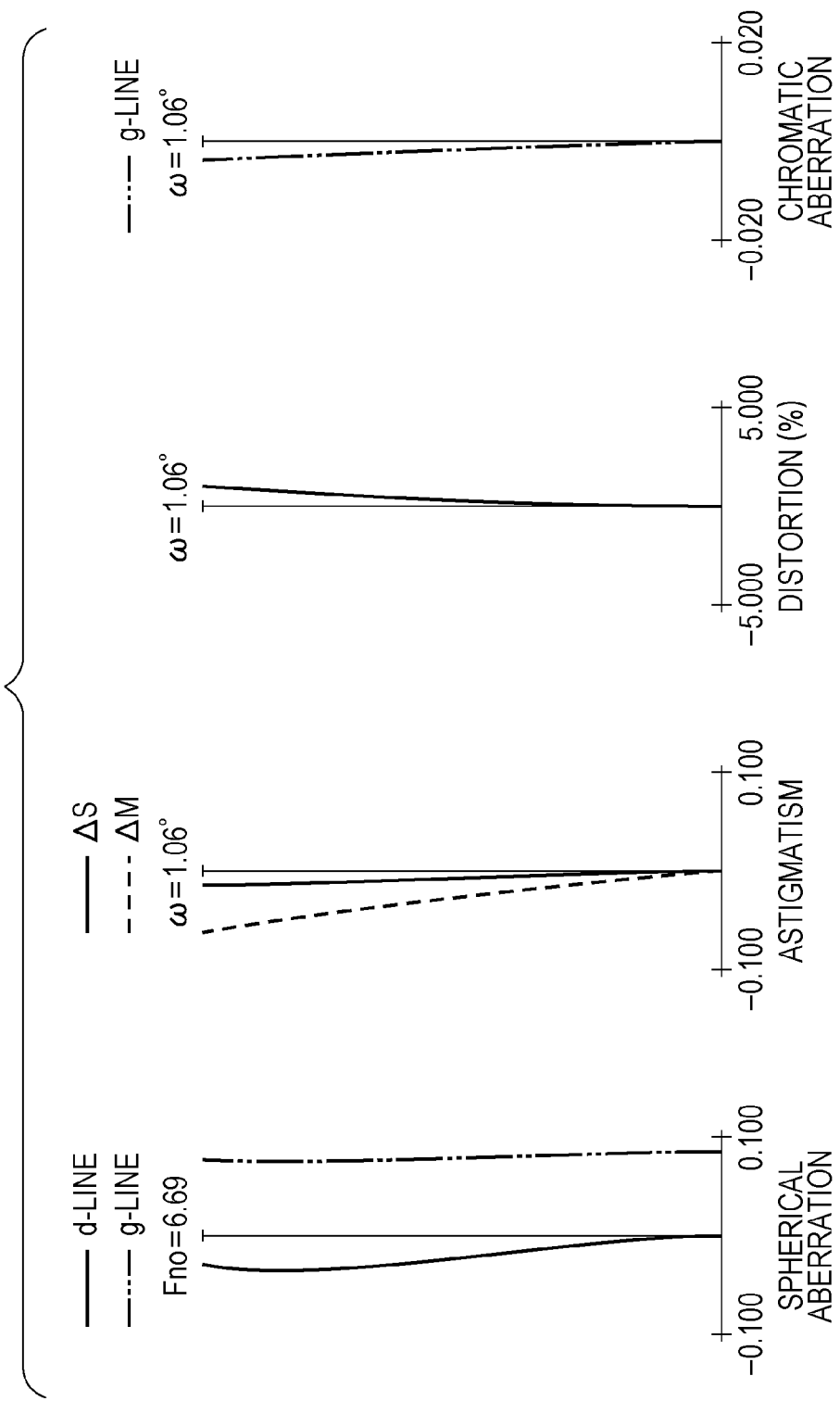

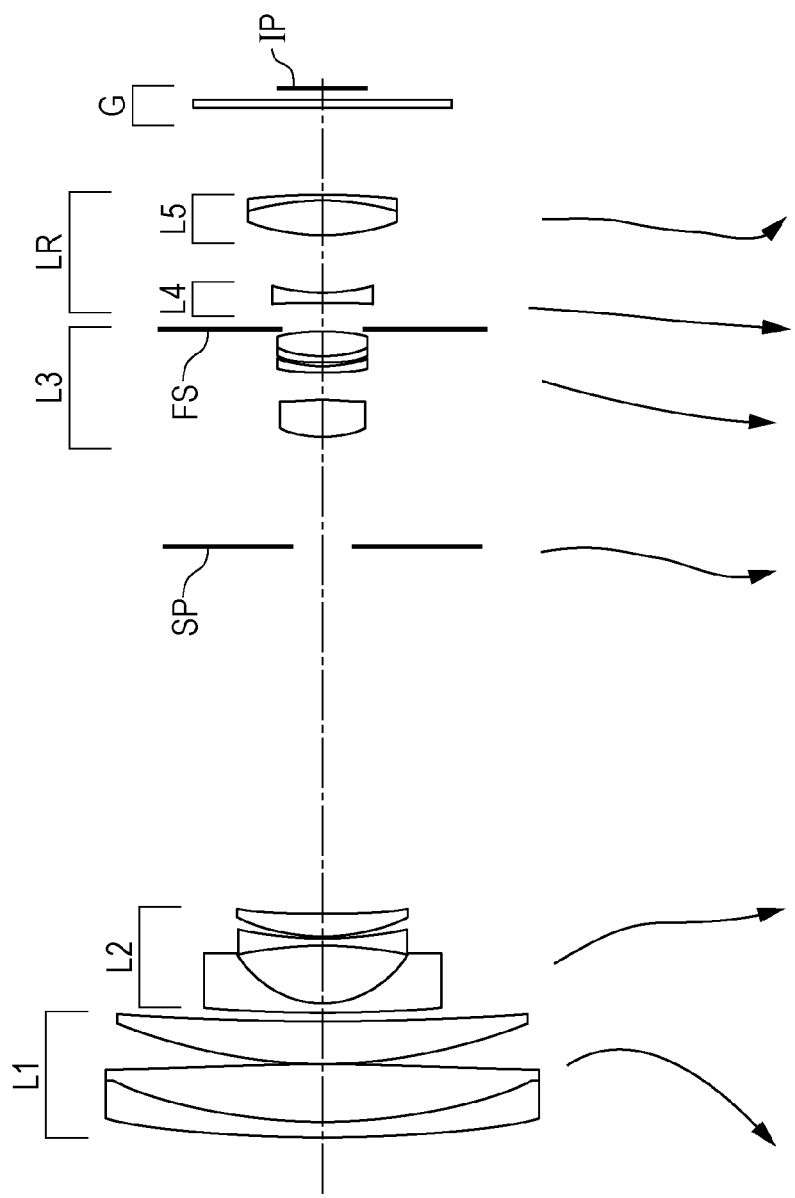

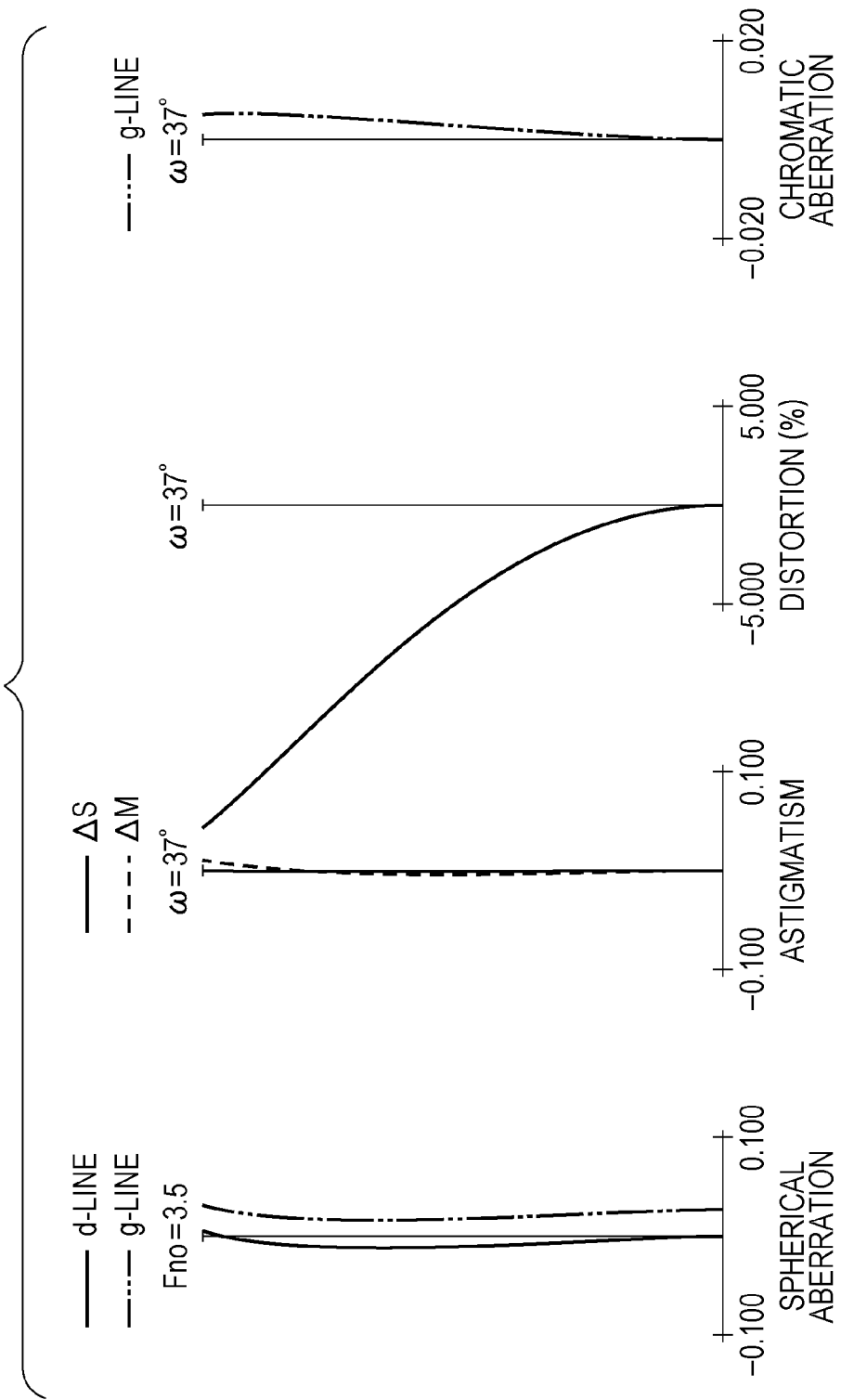

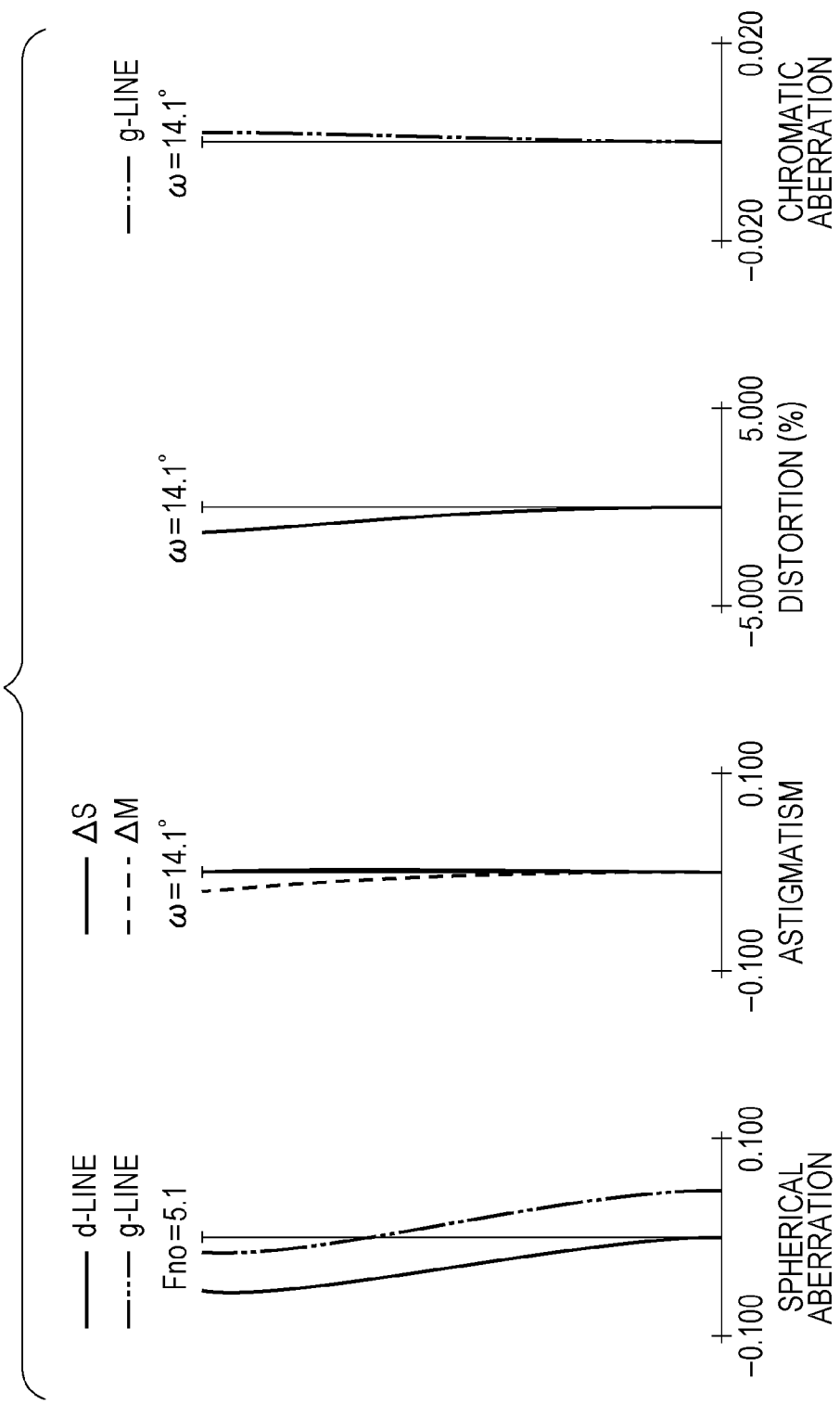

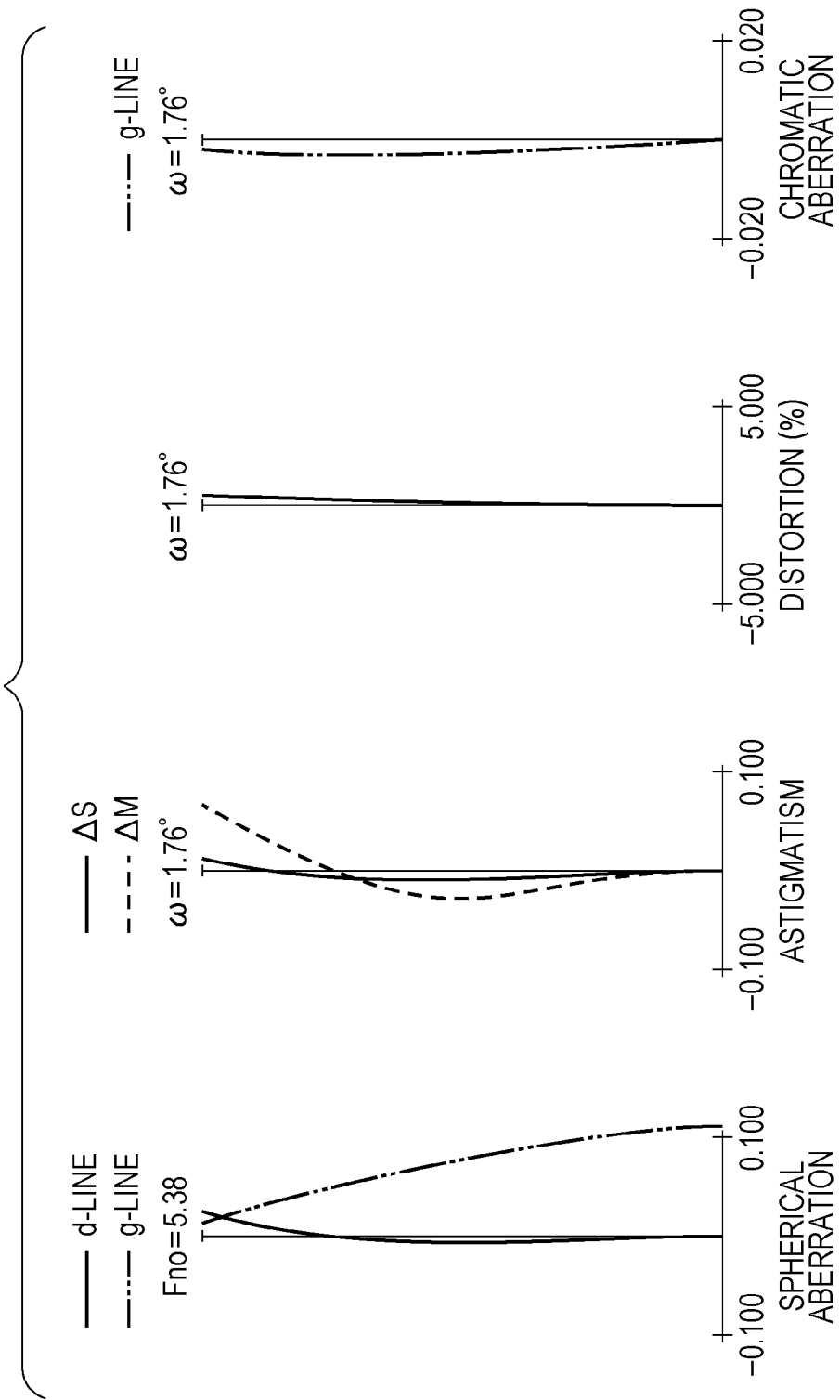

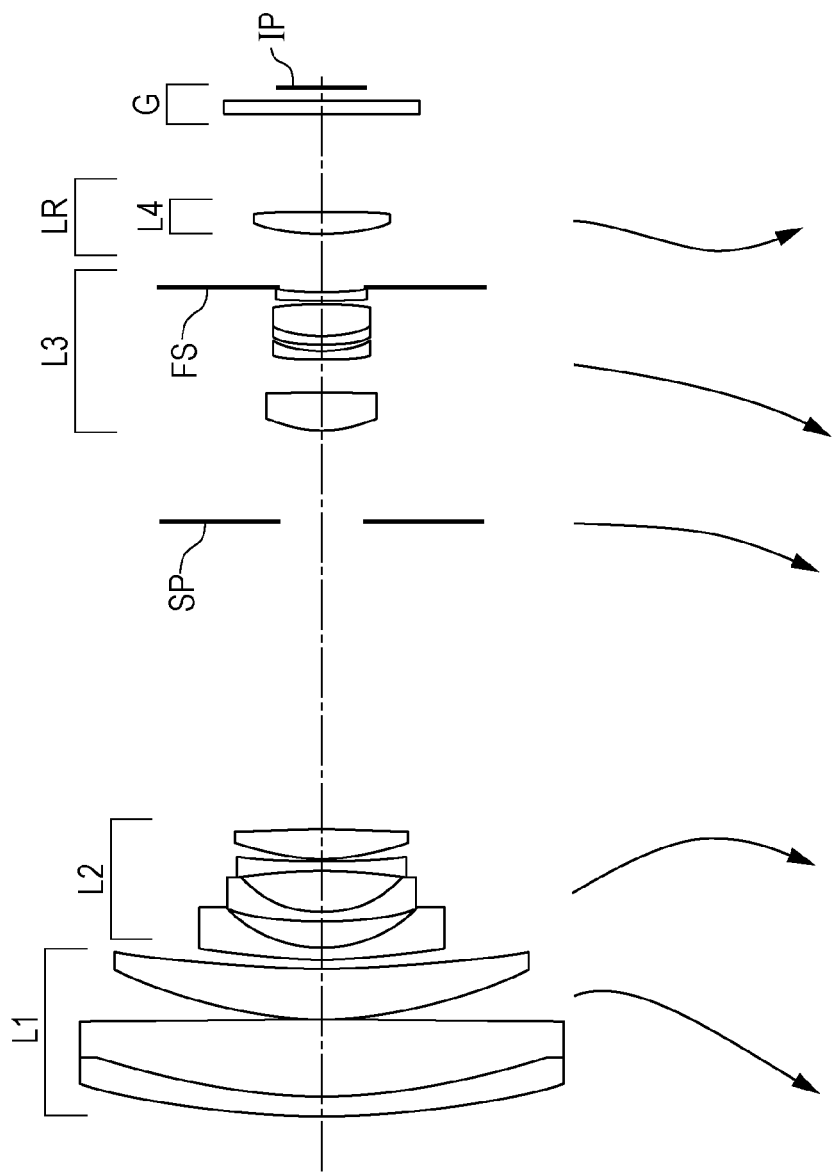

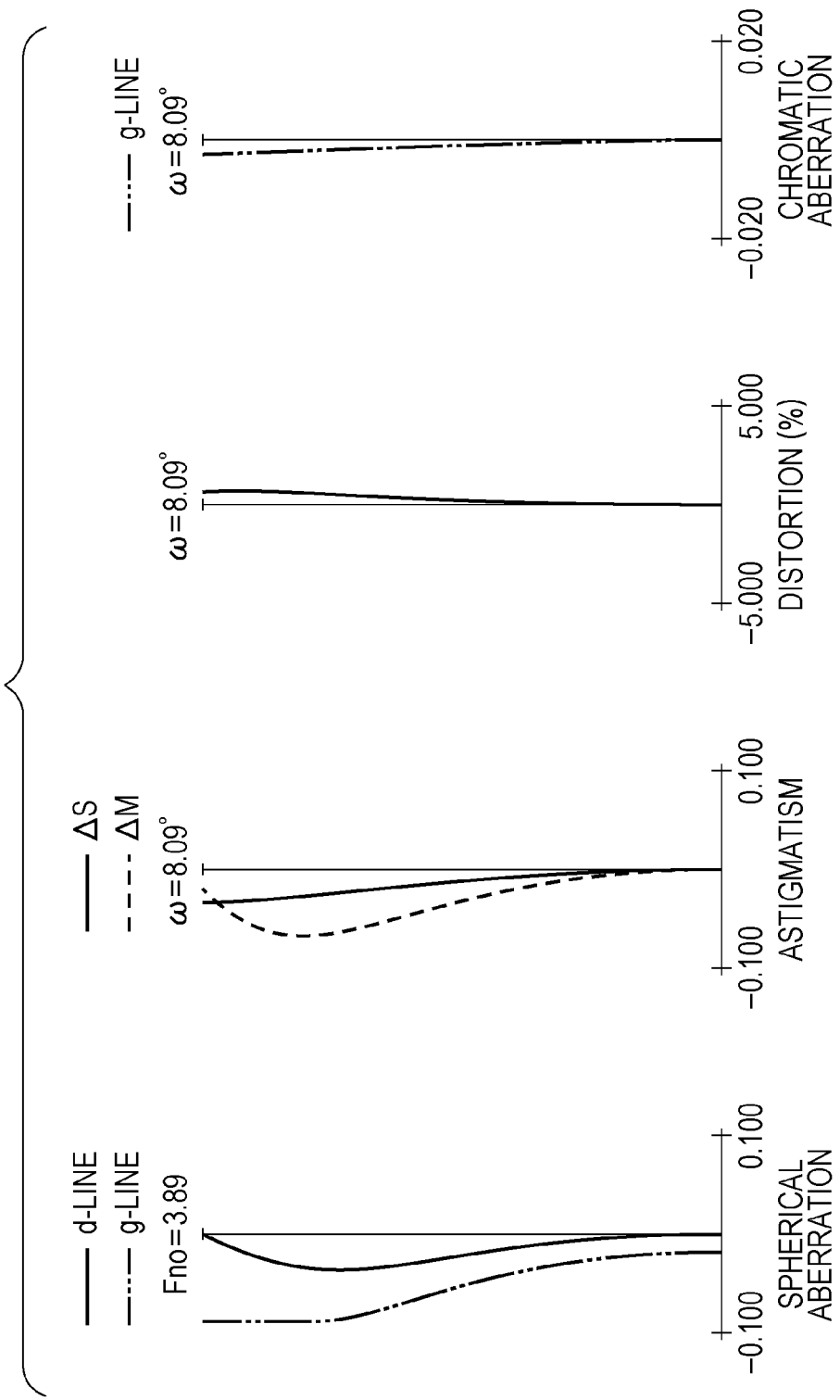

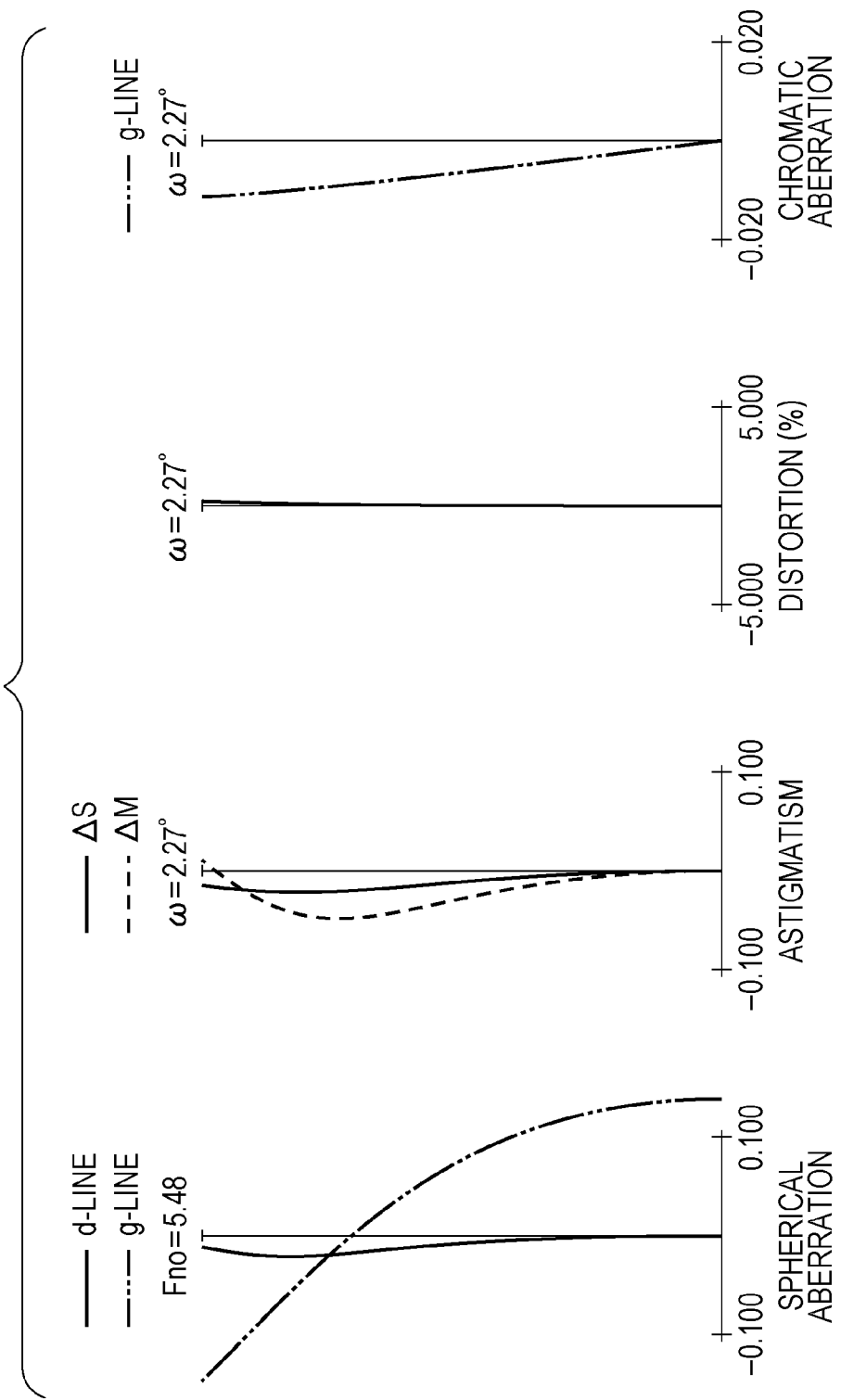

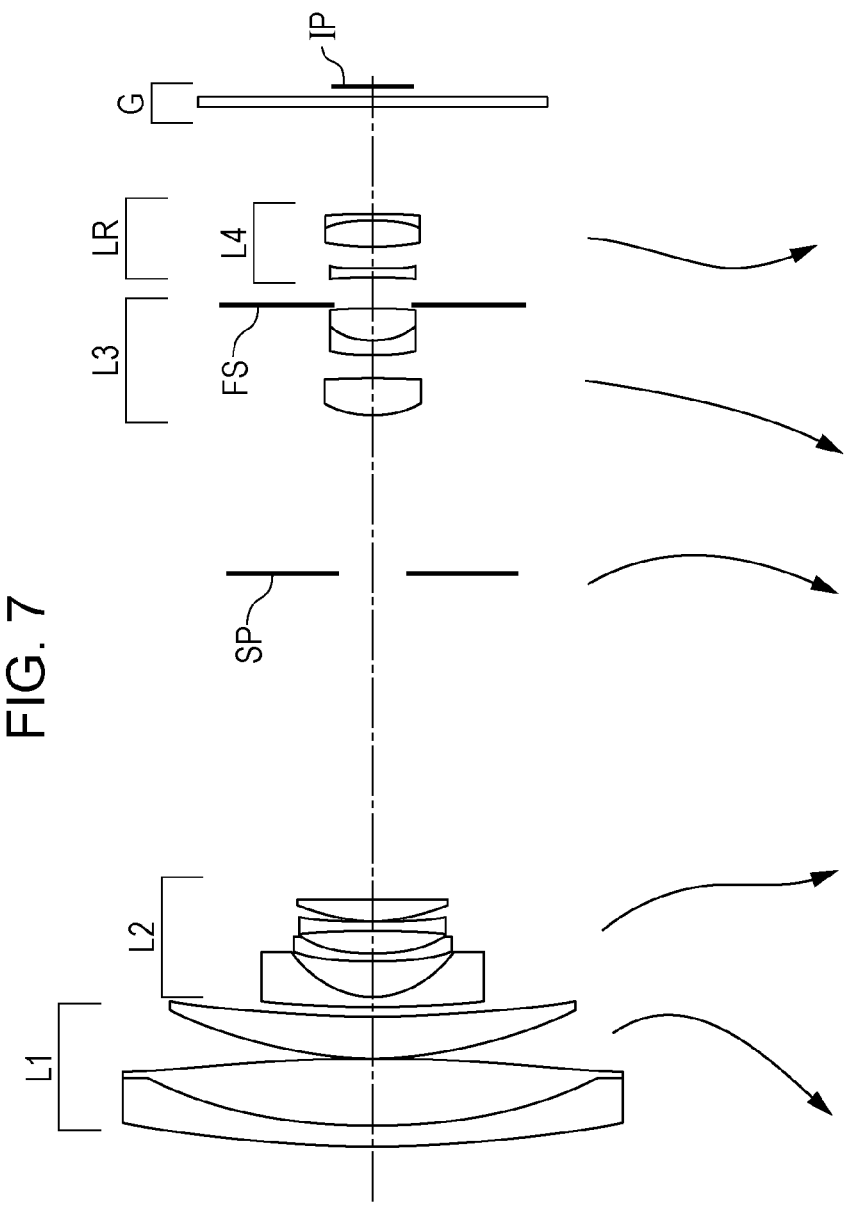

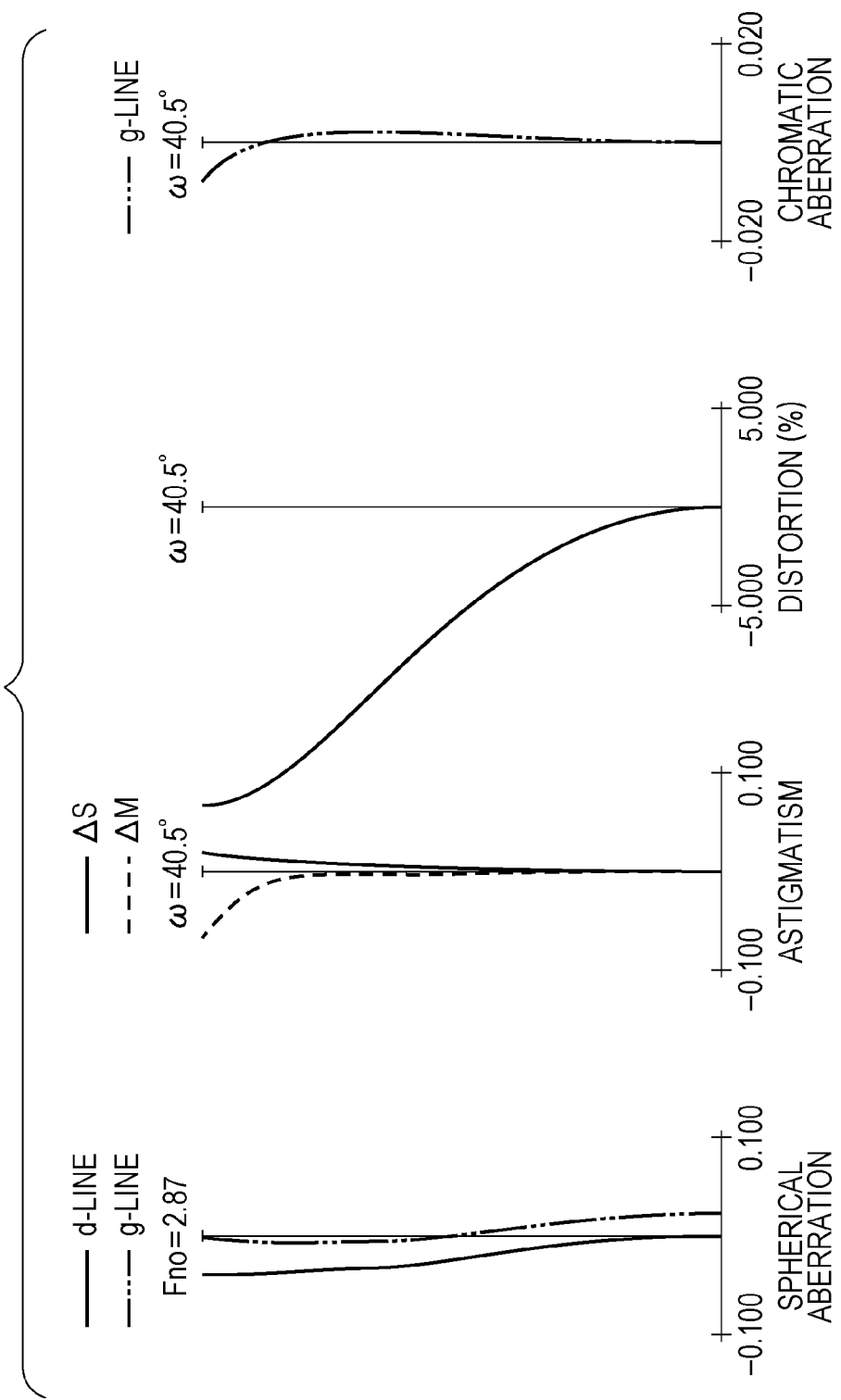

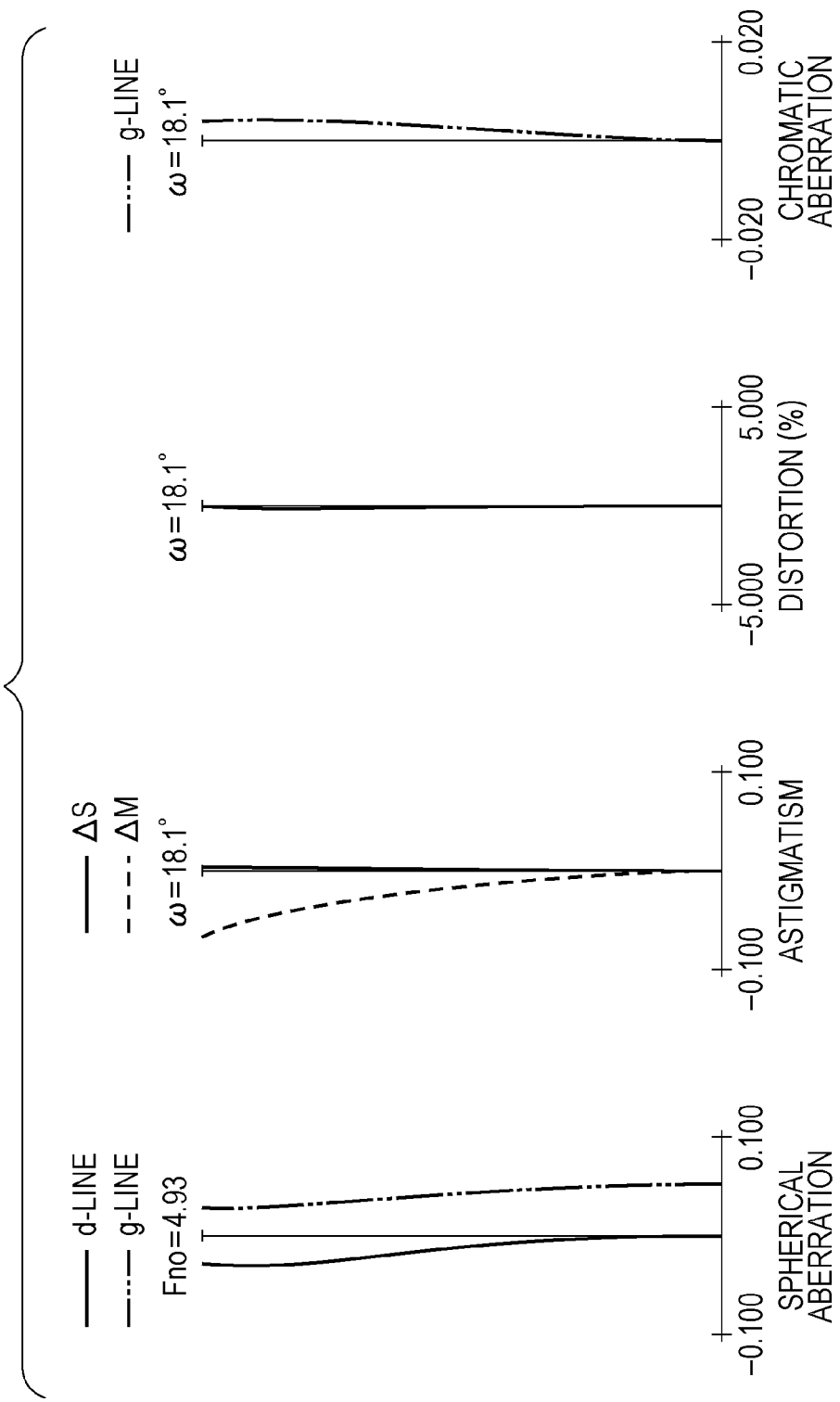

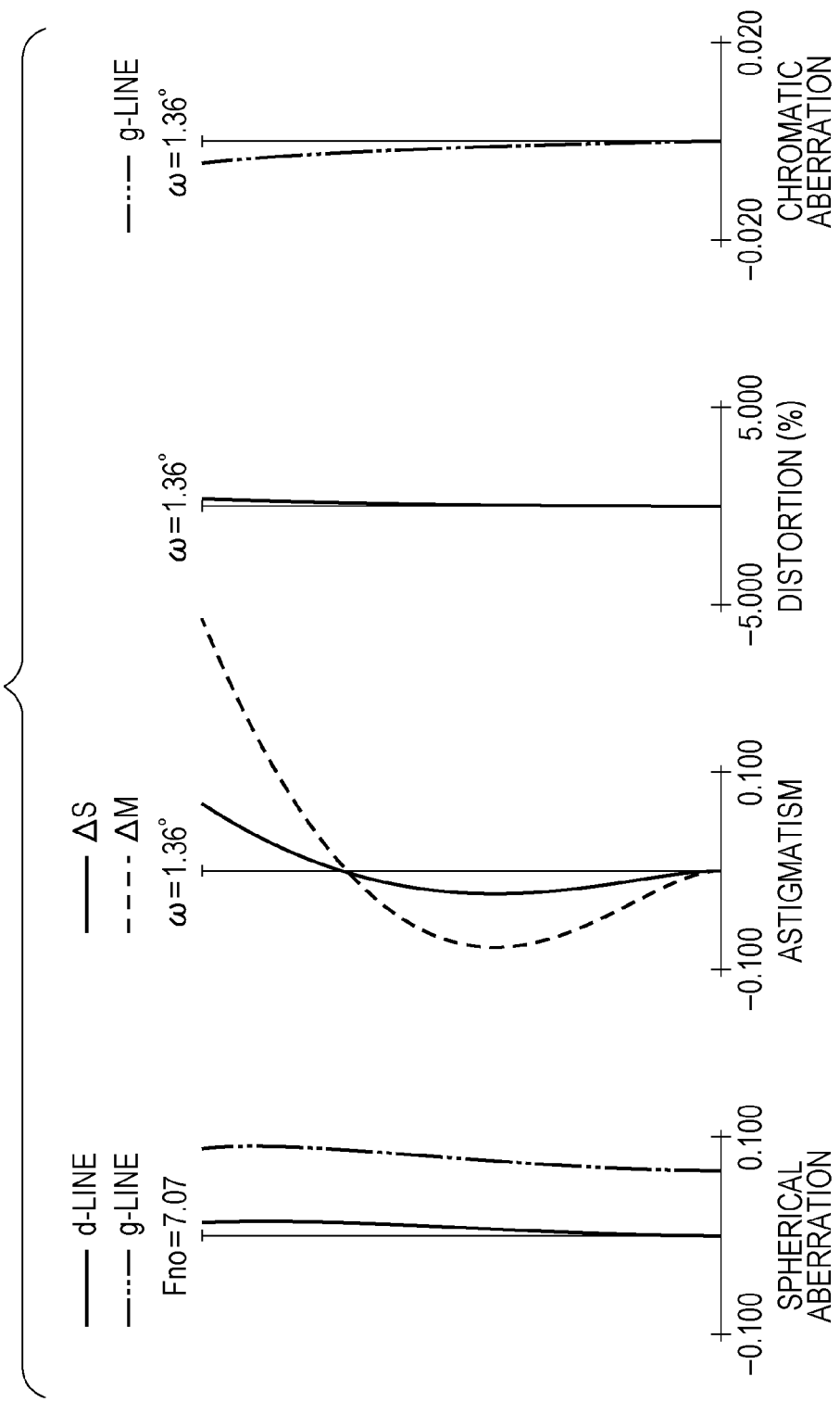

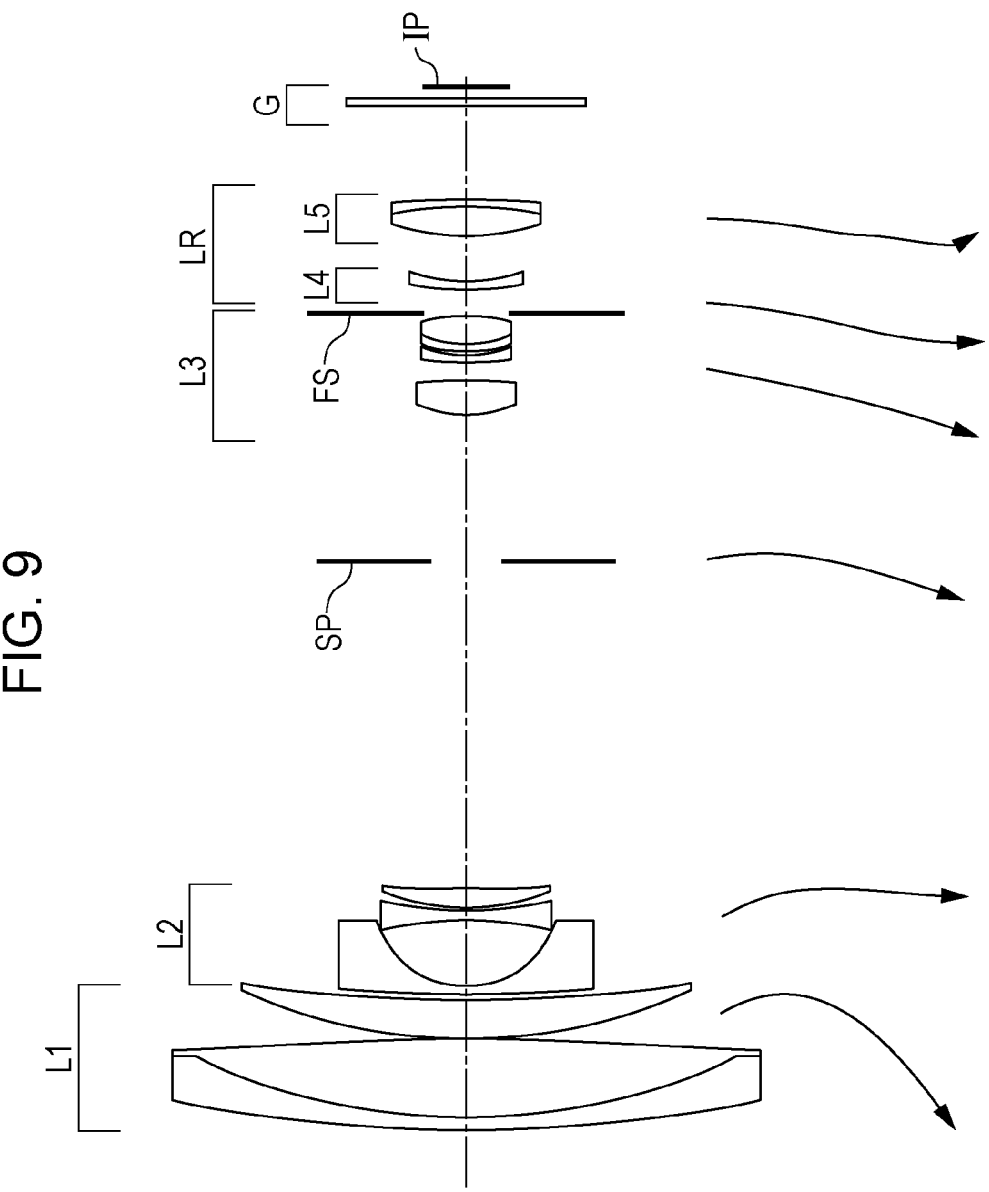

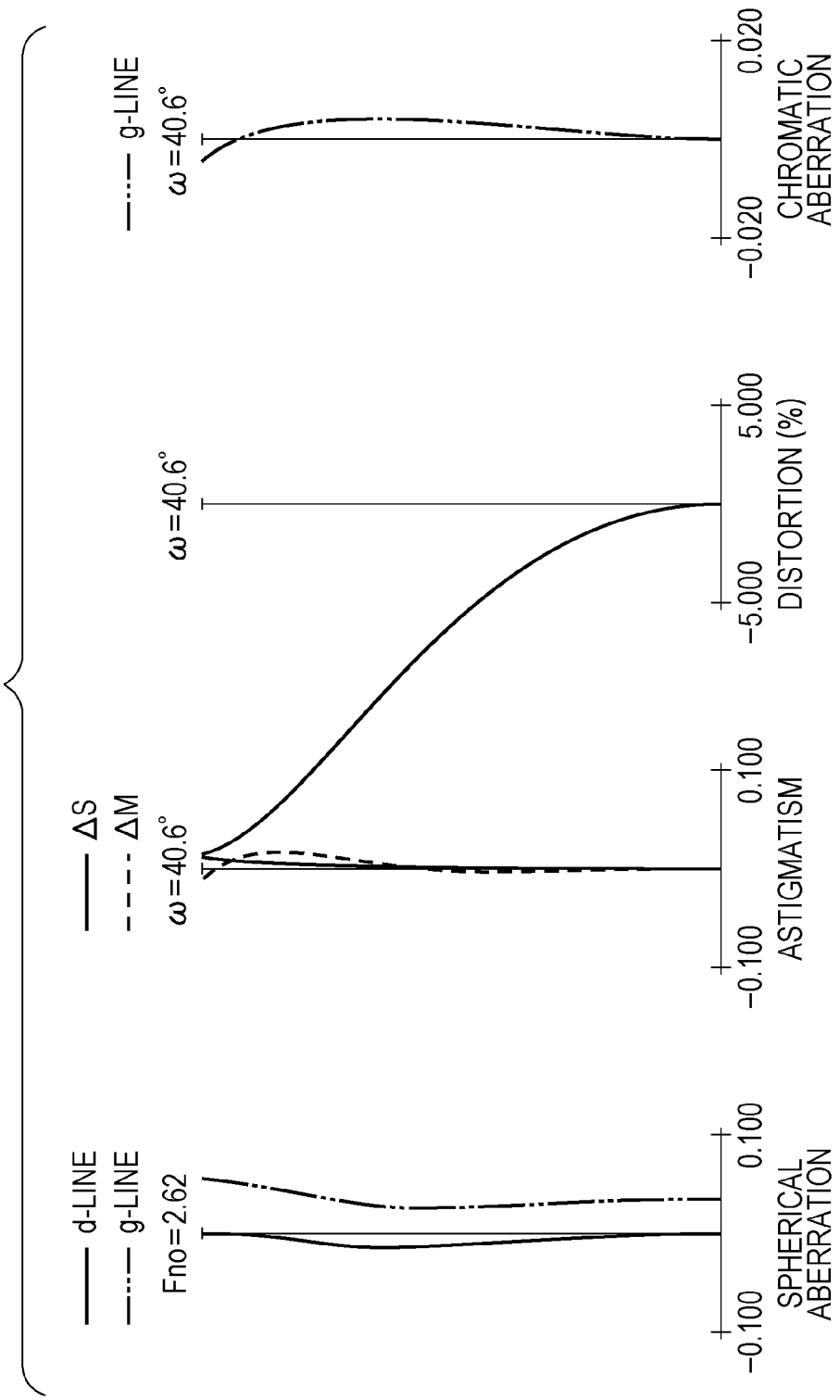

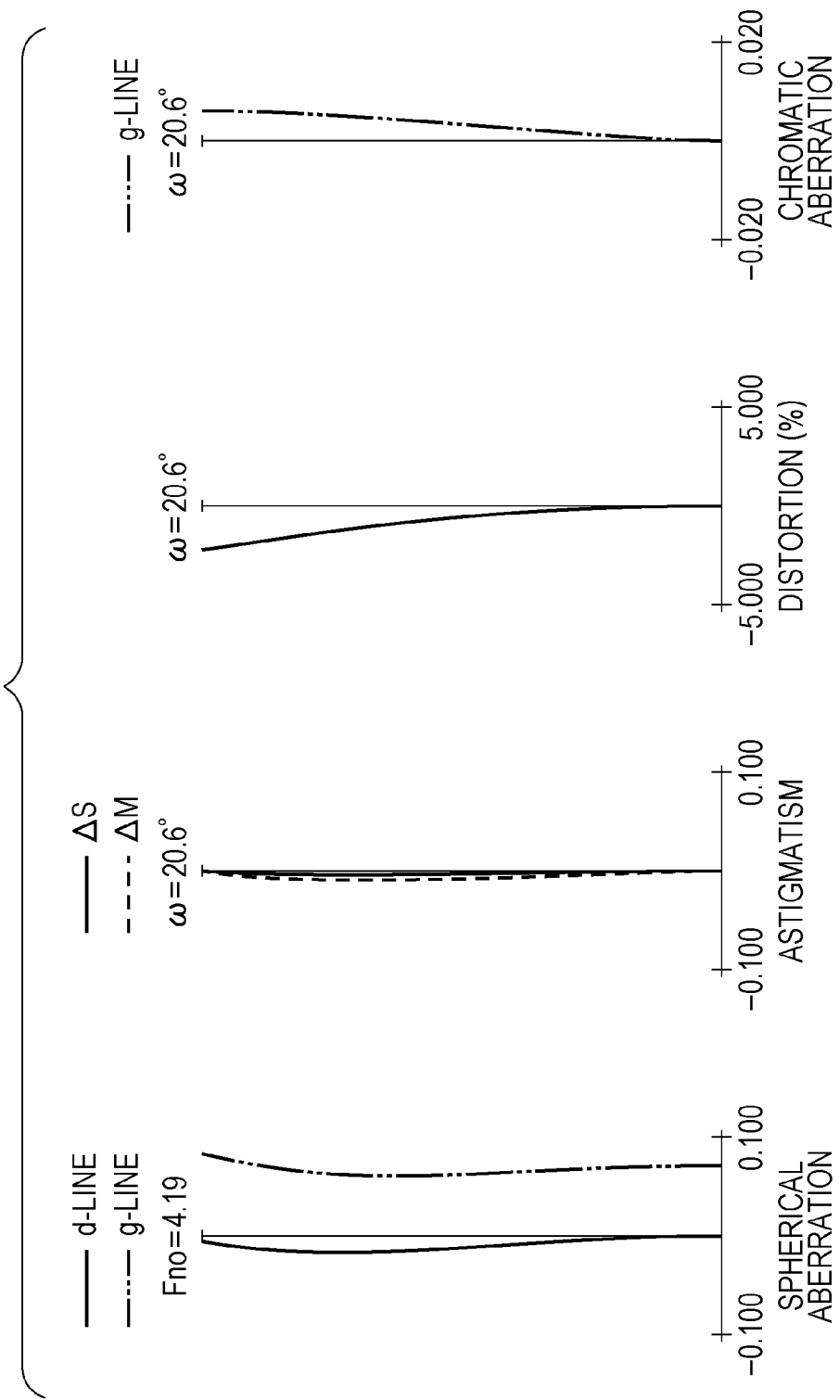

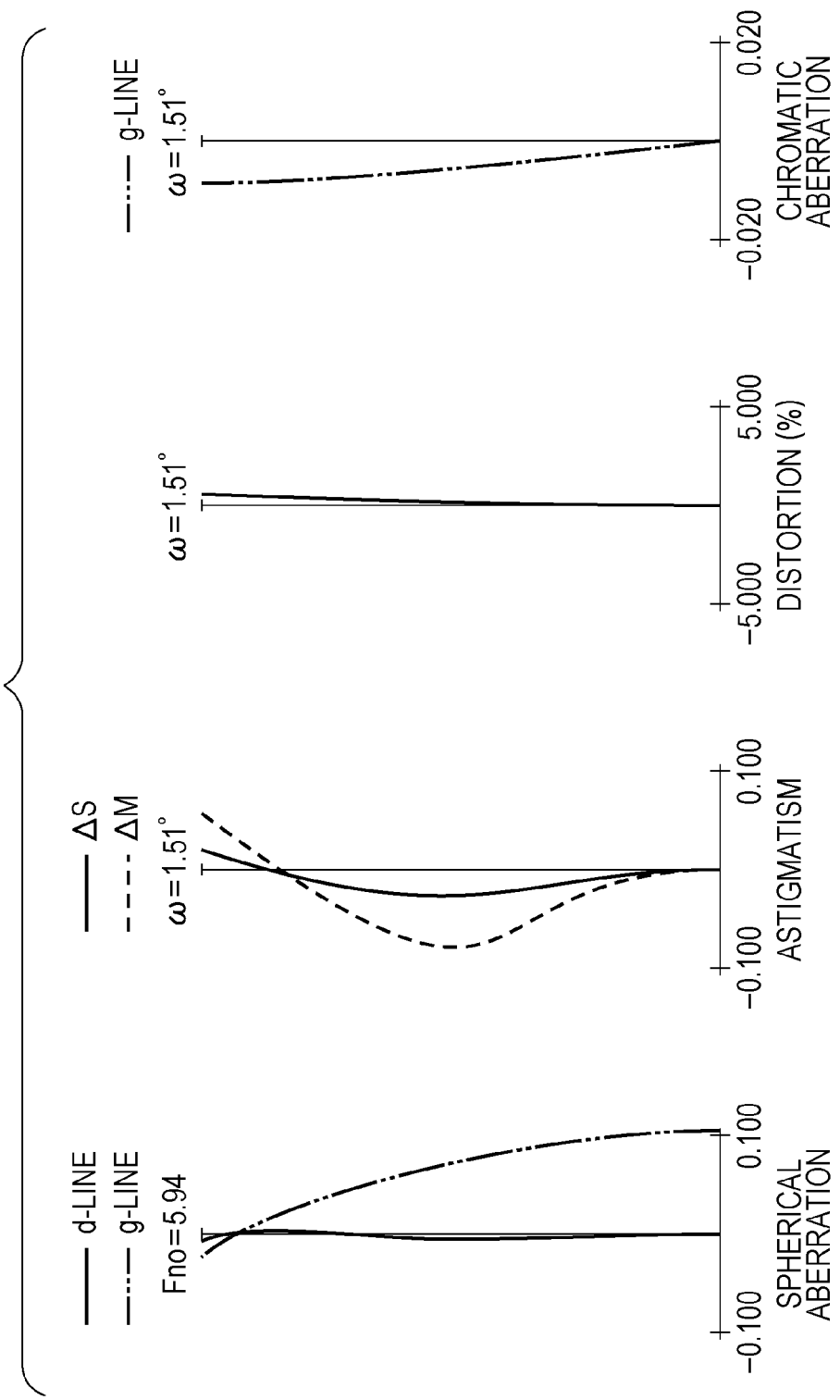

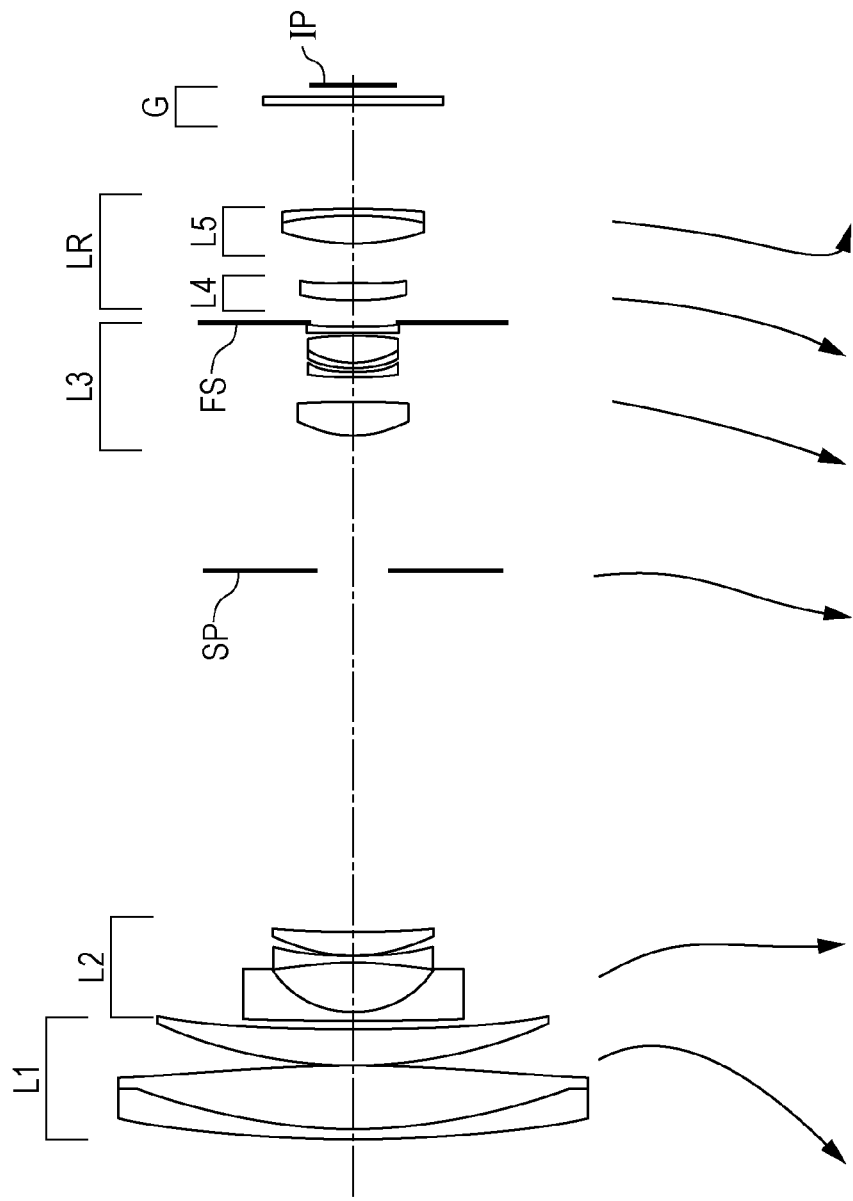

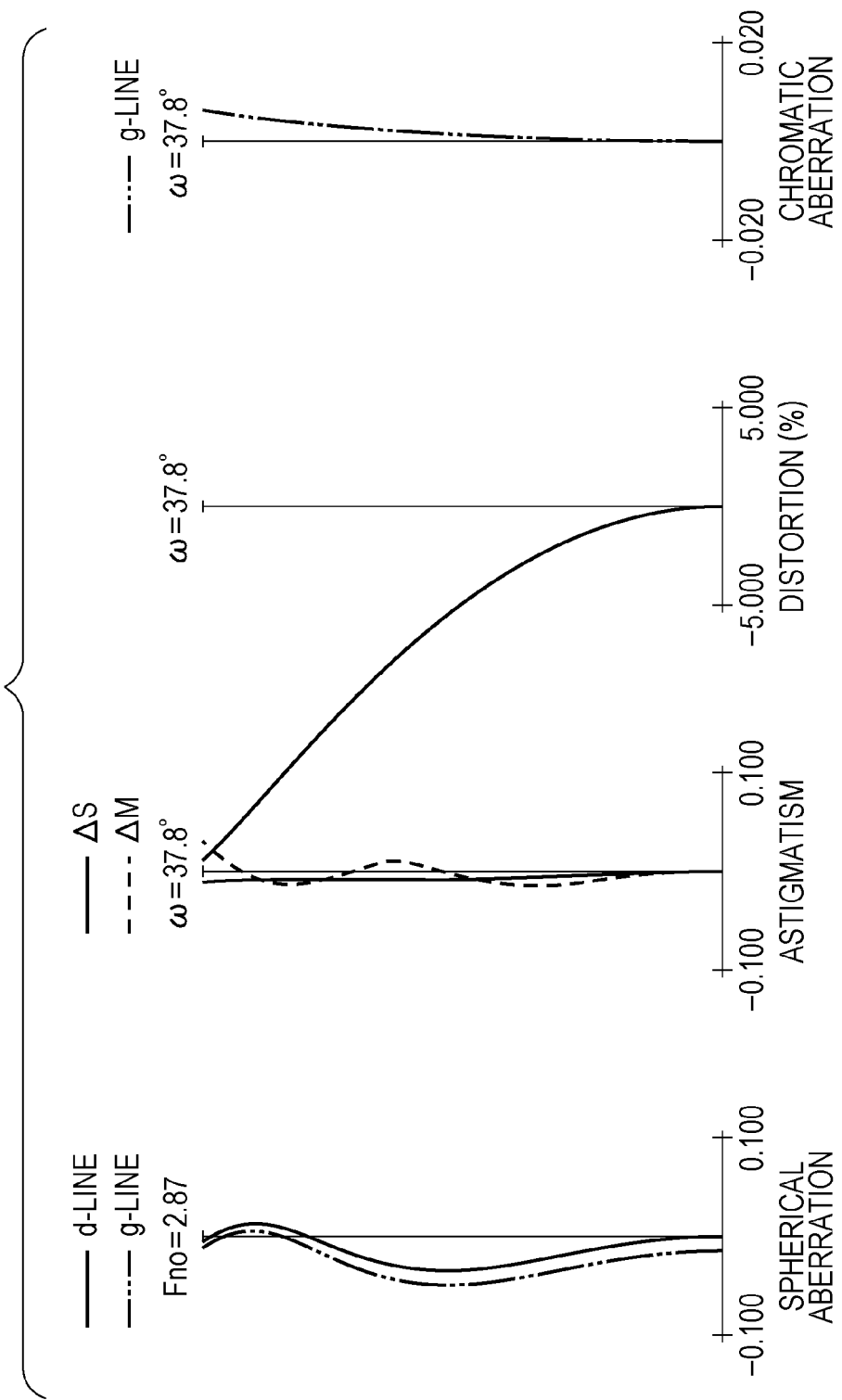

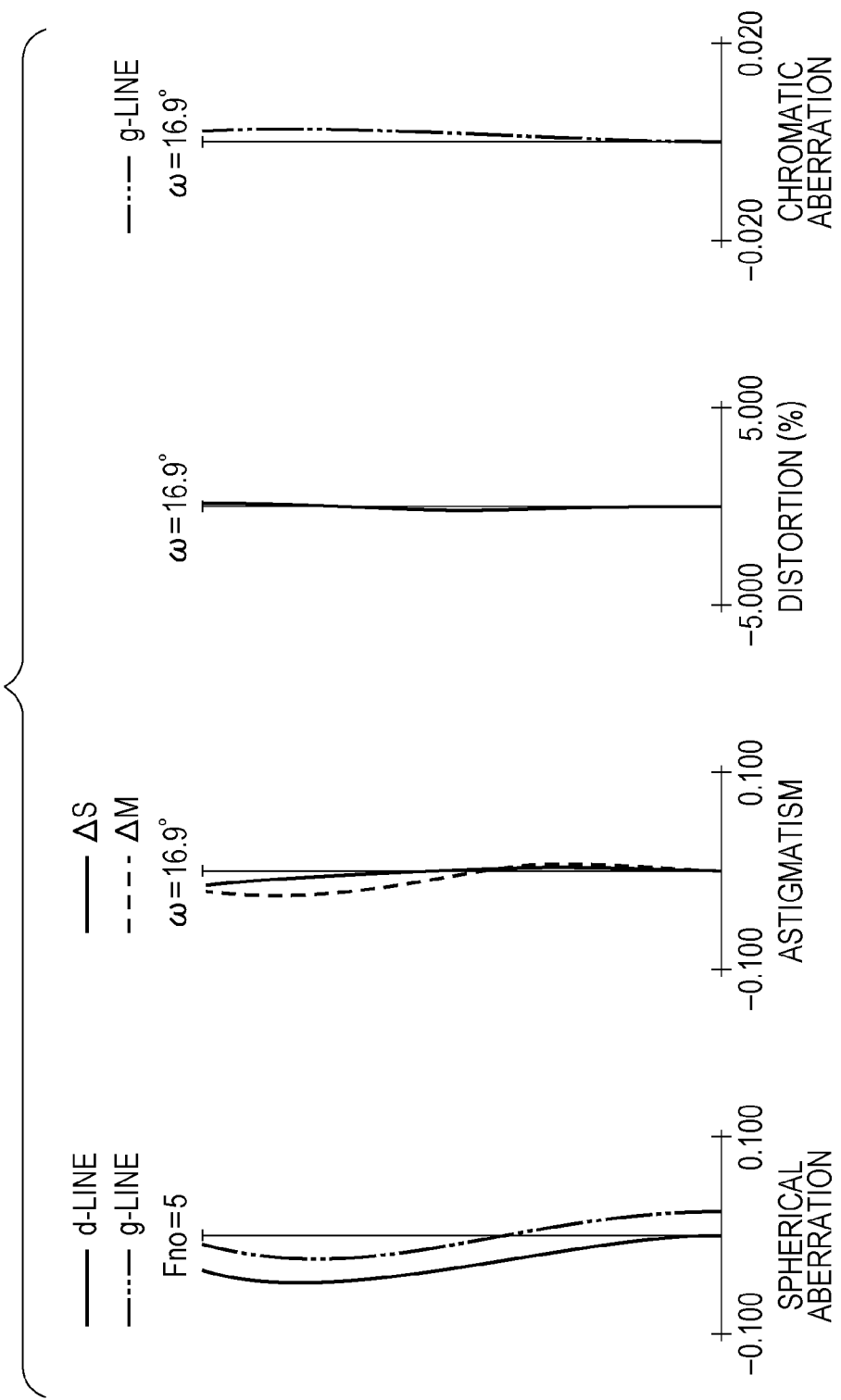

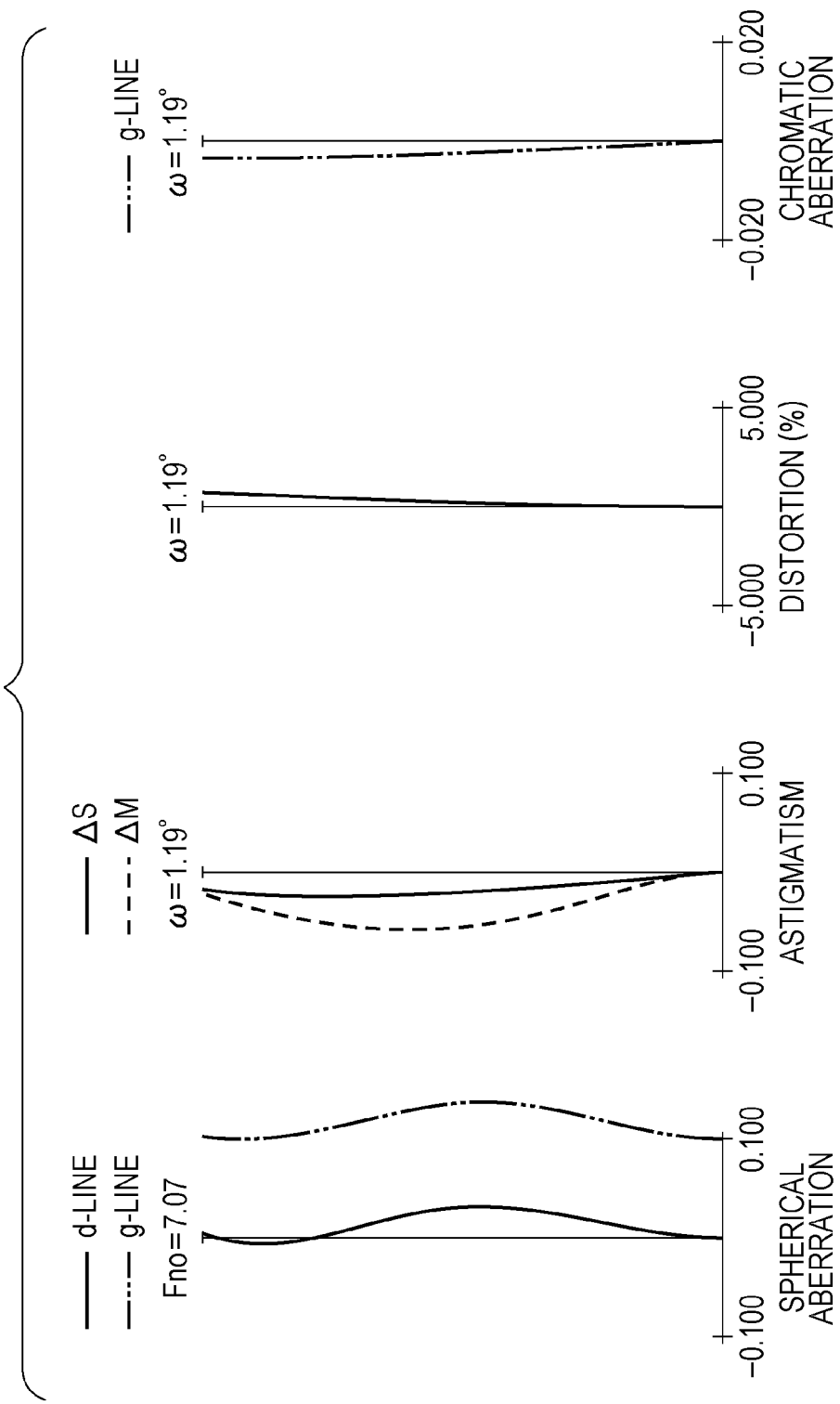

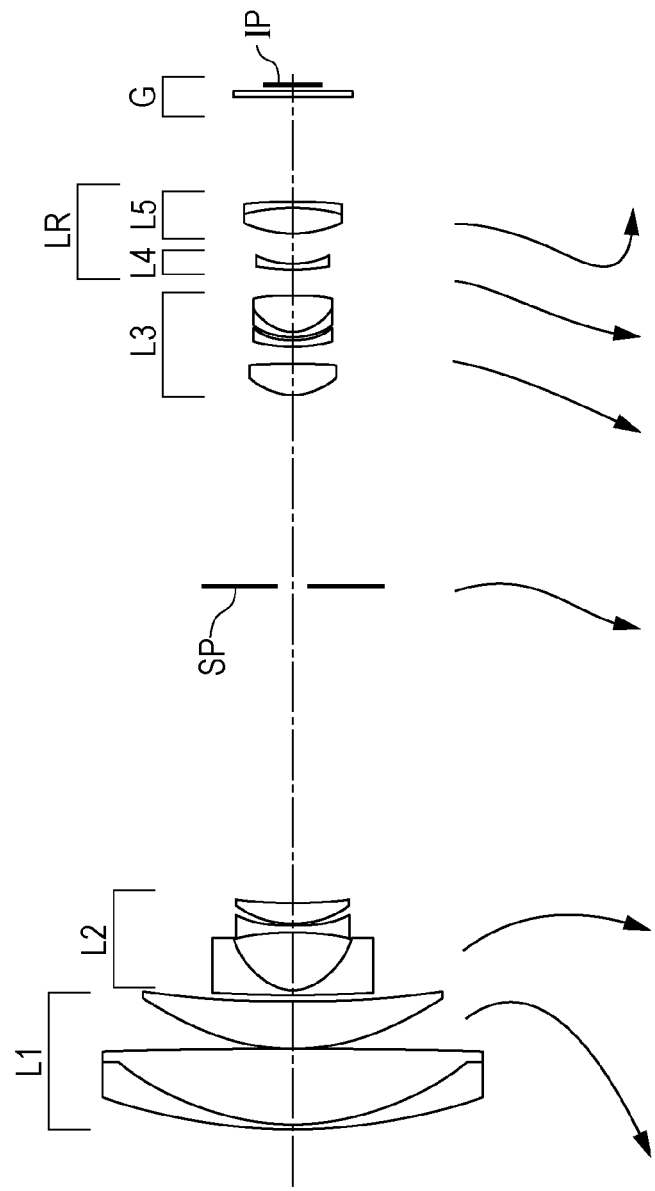

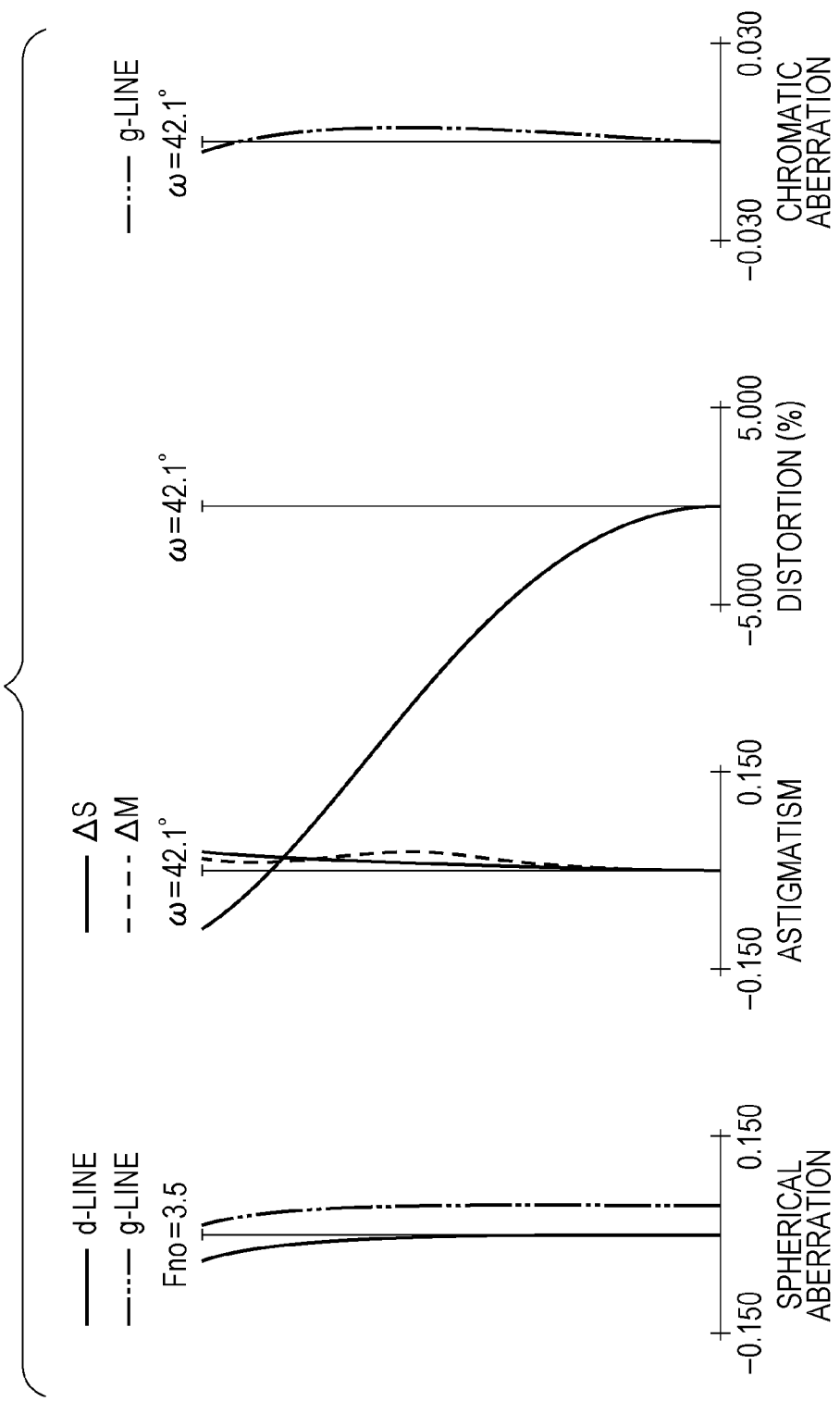

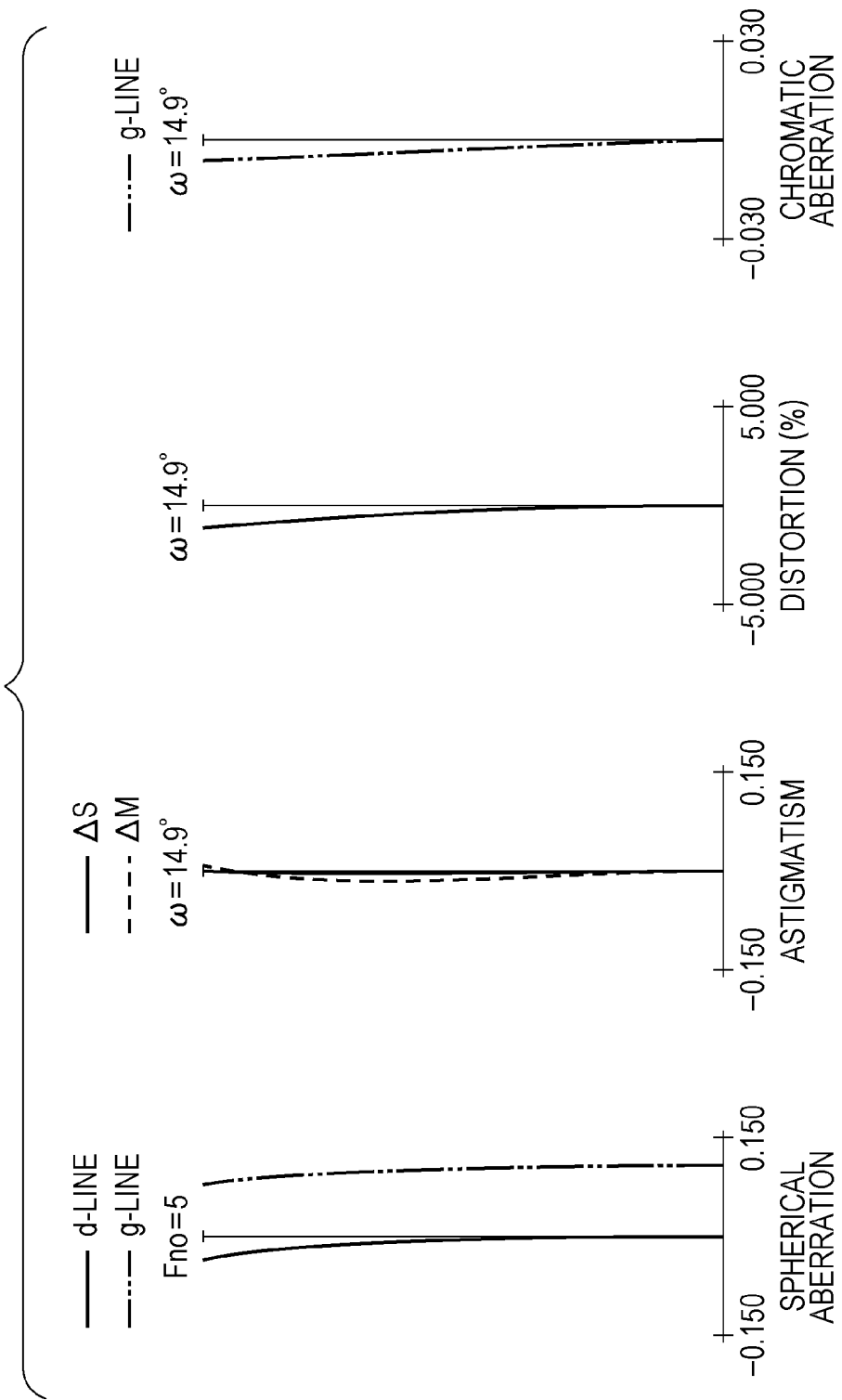

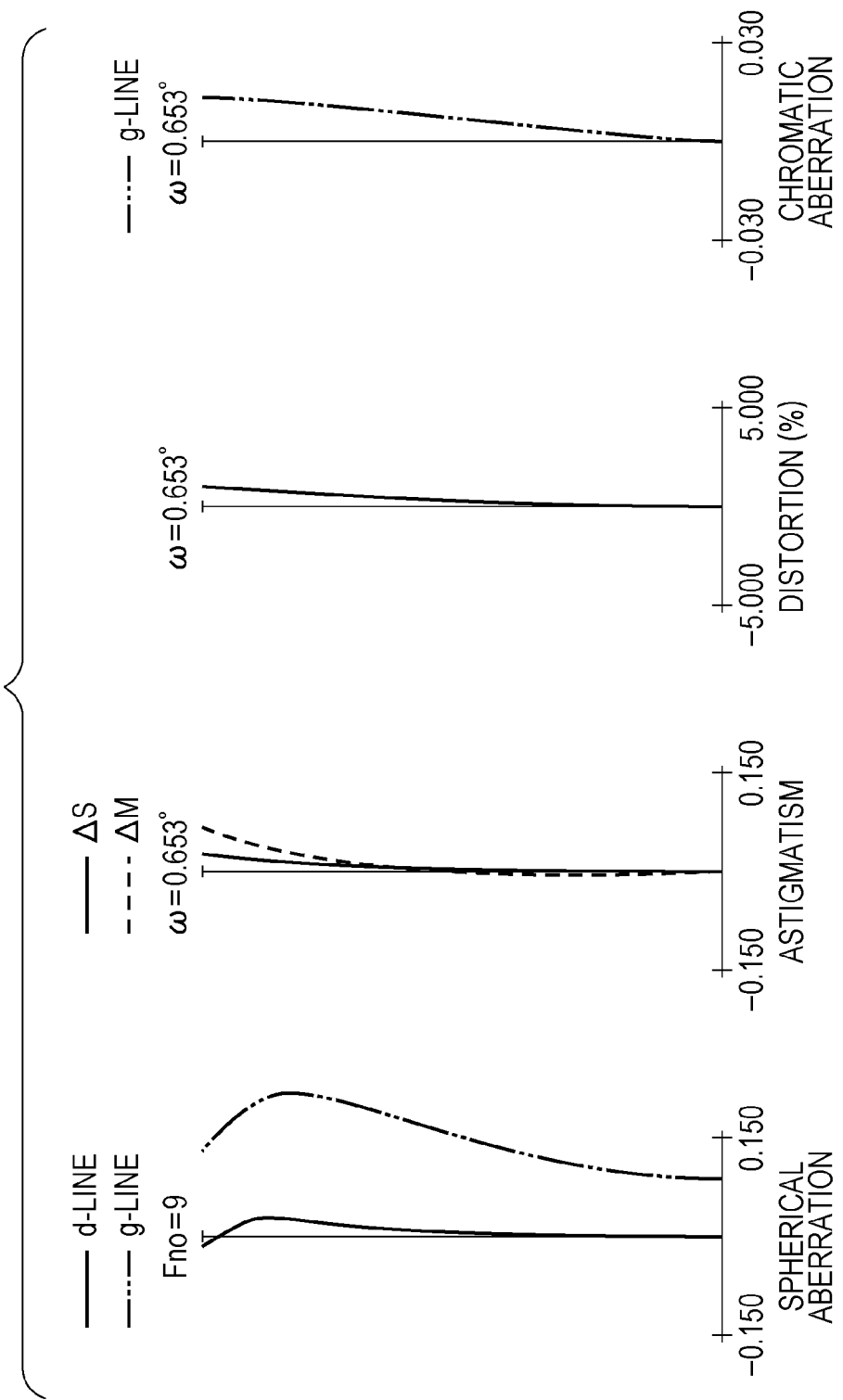

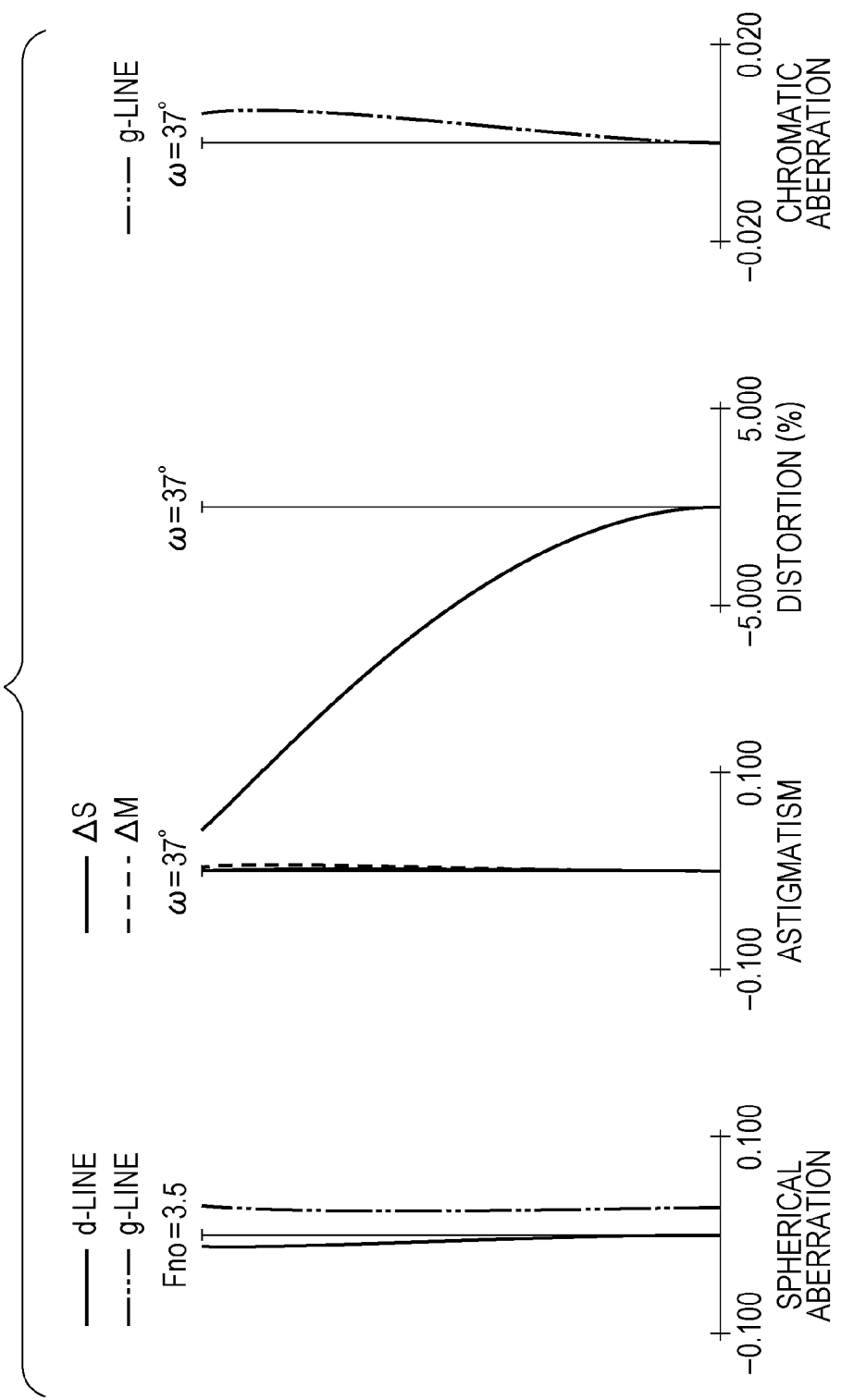

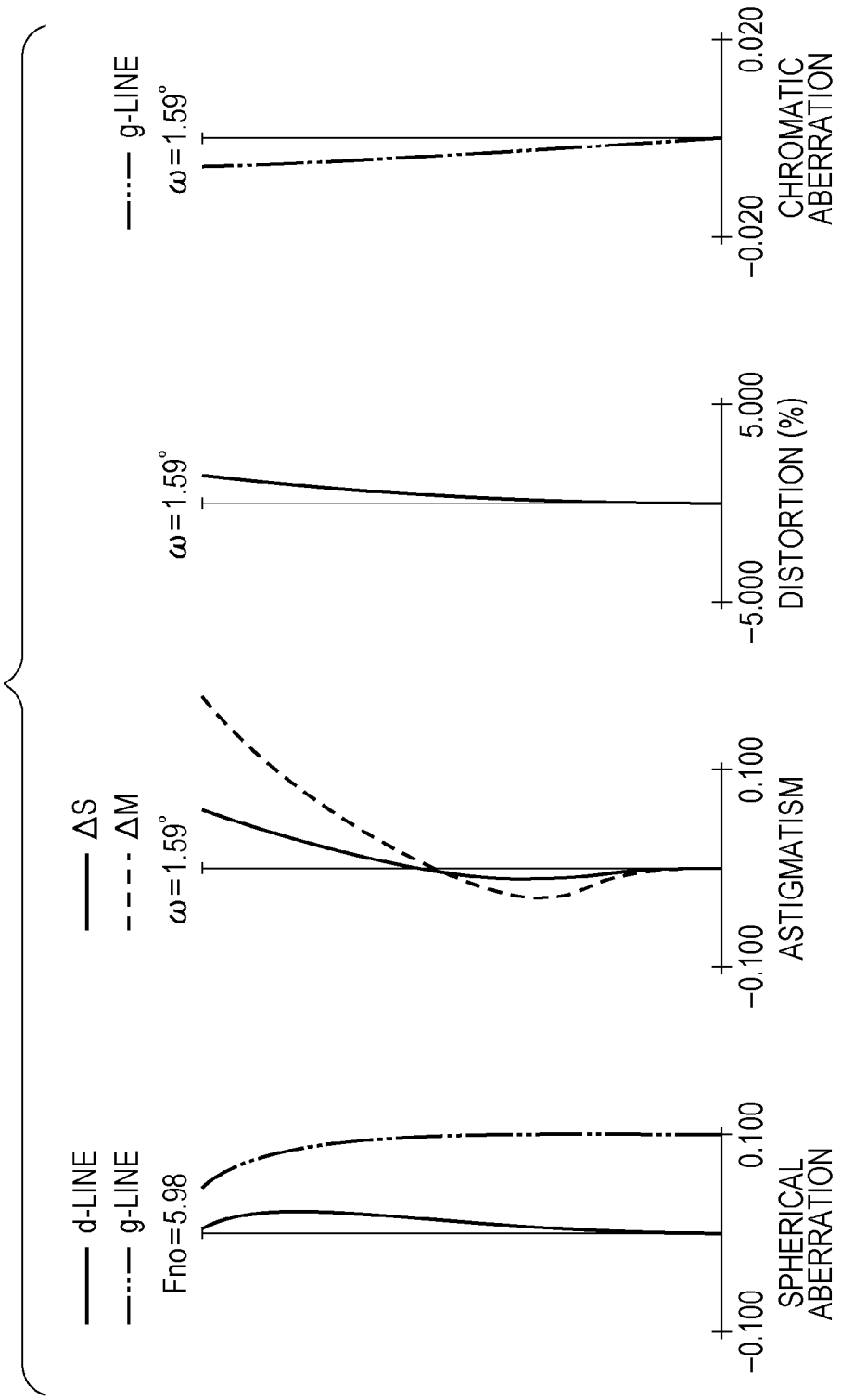

ZOOM LENS AND IMAGE PICKUP APPARATUS INCLUDING THE SAME

BACKGROUND OF THE INVENTION

1. Field of the Invention

The present invention relates to zoom lenses, and more particularly, to a zoom lens suitable for use as an imaging lens in an image pickup apparatus, such as a digital still camera, a video camera, a monitoring camera, a broadcast camera, or a film camera.

2. Description of the Related Art

A zoom lens having a small overall lens length (distance from a first lens surface to an image plane) and a high zoom ratio is required as an imaging lens for use in an image pickup apparatus including a solid-state image pickup device, such as a CCD or a CMOS.

A positive lead type zoom lens is known which includes, in order from the object side to the image side, a first lens unit having a positive refractive power (optical power is the reciprocal of a focal length), a second lens unit having a negative refractive power, a third lens unit having a positive refractive power, and a rear lens group including one or more lens units.

U.S. Pat. No. 7,830,613 discloses a zoom lens which includes, in order from the object side to the image side, a first lens unit having a positive refractive power, a second lens unit having a negative refractive power, a third lens unit having a positive refractive power, and a fourth lens unit having a positive refractive power and in which all of the lens units are moved during zooming.

U.S. Pat. No. 7,593,164 discloses a zoom lens which includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power.

In general, the size of a zoom lens can be reduced while maintaining a certain zoom ratio by increasing the refractive power of each of the lens units included in the zoom lens and reducing the number of lenses. However, in such a zoom lens, aberrations largely vary during zooming and it is difficult to obtain high optical performance over the entire zoom range. In particular, large aberrations, such as chromatic aberration, which are difficult to correct are generated at the telephoto end.

The present invention provides a small high-zoom-ratio zoom lens having high optical performance over the entire zoom range and an image pickup apparatus including the zoom lens.

SUMMARY OF THE INVENTION

A zoom lens according to an aspect of the present invention includes, in order from an object side to an image side, a first lens unit having a positive refractive power, a second lens unit having a negative refractive power, a third lens unit having a positive refractive power, and a rear lens group including one or more lens units. The first lens unit is closer to the object side at a telephoto end than at a wide angle end and the second lens unit is closer to the image side at the telephoto end than at the wide angle end. When Dt23 is a distance between the second lens unit and the third lens unit at the telephoto end, fw and ft are focal lengths of the entire zoom lens at the wide angle end and the telephoto end, respectively, f2 is a focal length of the second lens unit, and M2 is an amount of movement of the second lens unit in an optical axis direction during zooming from the wide angle end to the telephoto end, the following conditional expressions are satisfied:

$$Dt23/\sqrt{fw*ft} < 0.09$$

$$0.01 < |f2|/ft < 0.10$$

$$-5.00 < M2/|f2| < -0.70$$

Further features of the present invention will become apparent from the following description of exemplary embodiments with reference to the attached drawings.

BRIEF DESCRIPTION OF THE DRAWINGS

FIG. 1 is a sectional view of a zoom lens according to a first embodiment of the present invention at the wide angle end.

FIGS. 2A, 2B, and 2C are aberration diagrams of a first numerical example, which corresponds to the first embodiment of the present invention, at the wide angle end, an intermediate zooming position, and the telephoto end, respectively.

FIG. 3 is a sectional view of a zoom lens according to a second embodiment of the present invention at the wide angle end.

FIGS. 4A, 4B, and 4C are aberration diagrams of a second numerical example, which corresponds to the second embodiment of the present invention, at the wide angle end, an intermediate zooming position, and the telephoto end, respectively.

FIG. 5 is a sectional view of a zoom lens according to a third embodiment of the present invention at the wide angle end.

FIGS. 6A, 6B, and 6C are aberration diagrams of a third numerical example, which corresponds to the third embodiment of the present invention, at the wide angle end, an intermediate zooming position, and the telephoto end, respectively.

FIG. 7 is a sectional view of a zoom lens according to a fourth embodiment of the present invention at the wide angle end.

FIGS. 8A, 8B, and 8C are aberration diagrams of a fourth numerical example, which corresponds to the fourth embodiment of the present invention, at the wide angle end, an intermediate zooming position, and the telephoto end, respectively.

FIG. 9 is a sectional view of a zoom lens according to a fifth embodiment of the present invention at the wide angle end.

FIGS. 10A, 10B, and 10C are aberration diagrams of a fifth numerical example, which corresponds to the fifth embodiment of the present invention, at the wide angle end, an intermediate zooming position, and the telephoto end, respectively.

FIG. 11 is a sectional view of a zoom lens according to a sixth embodiment of the present invention at the wide angle end.

FIGS. 12A, 12B, and 12C are aberration diagrams of a sixth numerical example, which corresponds to the sixth embodiment of the present invention, at the wide angle end, an intermediate zooming position, and the telephoto end, respectively.

FIG. 13 is a sectional view of a zoom lens according to a seventh embodiment of the present invention at the wide angle end.

FIGS. 14A, 14B, and 14C are aberration diagrams of a seventh numerical example, which corresponds to the seventh embodiment of the present invention, at the wide angle end, an intermediate zooming position, and the telephoto end, respectively.

FIGS. 16A, 16B, and 16C are aberration diagrams of an eighth numerical example, which corresponds to the eighth embodiment of the present invention, at the wide angle end, an intermediate zooming position, and the telephoto end, respectively.

DESCRIPTION OF THE EMBODIMENTS

A zoom lens according to an embodiment of the present invention includes, in order from the object side to the image side, a first lens unit having a positive refractive power, a second lens unit having a negative refractive power, a third lens unit having a positive refractive power, and a rear lens group including one or more lens units. During zooming from the wide angle end to the telephoto end, the first lens unit is moved so as to be positioned closer to the object side at the telephoto end than at the wide angle end, and the second lens unit is moved so as to be positioned closer to the image side at the telephoto end than at the wide angle end. The rear lens group includes, in order from the object side to the image side, a fourth lens unit having a negative refractive power and a fifth lens unit having a positive refractive power. The fourth lens unit and the fifth lens unit are moved during zooming.

Alternatively, the rear lens group includes a fourth lens unit having a positive refractive power, and the fourth lens unit is moved during zooming. Alternatively, the rear lens group includes, in order from the object side to the image side, a fourth lens unit having a positive refractive power and a fifth lens unit having a positive refractive power, and the fourth lens unit and the fifth lens unit are moved during zooming.

FIG. 1 is a sectional view of a zoom lens according to a first embodiment of the present invention at the wide angle end (short focal length end). FIGS. 2A, 2B, and 2C are aberration diagrams of the zoom lens according to the first embodiment at the wide angle end, an intermediate zooming position, and the telephoto end (long focal length end), respectively. FIG. 3 is a sectional view of a zoom lens according to a second embodiment of the present invention at the wide angle end. FIGS. 4A, 4B, and 4C are aberration diagrams of the zoom lens according to the second embodiment at the wide angle end, an intermediate zooming position, and the telephoto end, respectively.

Figure 6A:
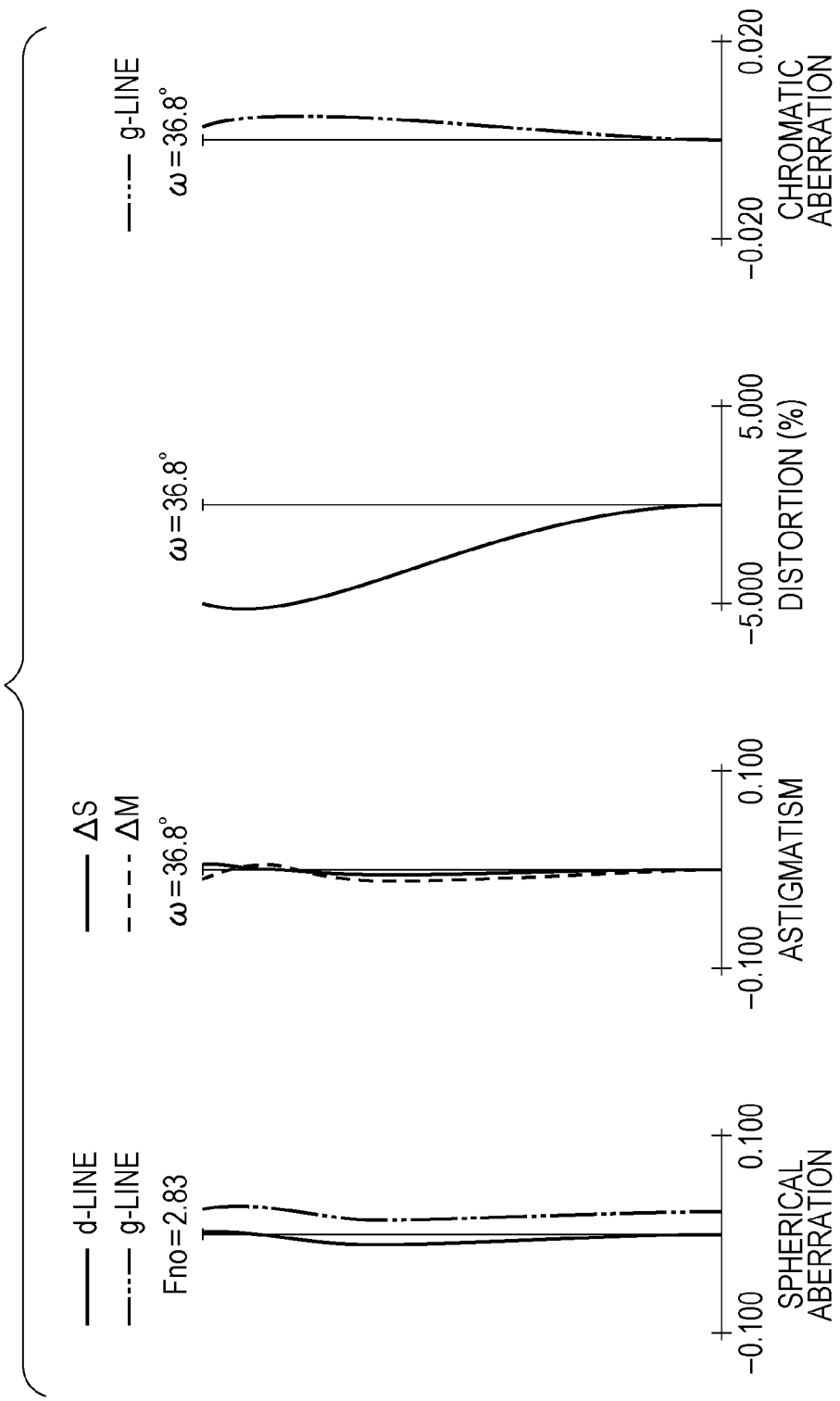

FIG. 5 is a sectional view of a zoom lens according to a third embodiment of the present invention at the wide angle end. FIGS. 6A, 6B, and 6C are aberration diagrams of the zoom lens according to the third embodiment at the wide angle end, an intermediate zooming position, and the telephoto end, respectively. FIG. 7 is a sectional view of a zoom lens according to a fourth embodiment of the present invention at the wide angle end. FIGS. 8A, 8B, and 8C are aberration diagrams of the zoom lens according to the fourth embodiment at the wide angle end, an intermediate zooming position, and the telephoto end, respectively.

FIG. 9 is a sectional view of a zoom lens according to a fifth embodiment of the present invention at the wide angle end. FIGS. 10A, 10B, and 10C are aberration diagrams of the zoom lens according to the fifth embodiment at the wide angle end, an intermediate zooming position, and the telephoto end, respectively. FIG. 11 is a sectional view of a zoom lens according to a sixth embodiment of the present invention at the wide angle end. FIGS. 12A, 12B, and 12C are aberration diagrams of the zoom lens according to the sixth embodiment at the wide angle end, an intermediate zooming position, and the telephoto end, respectively.

Figure 15:
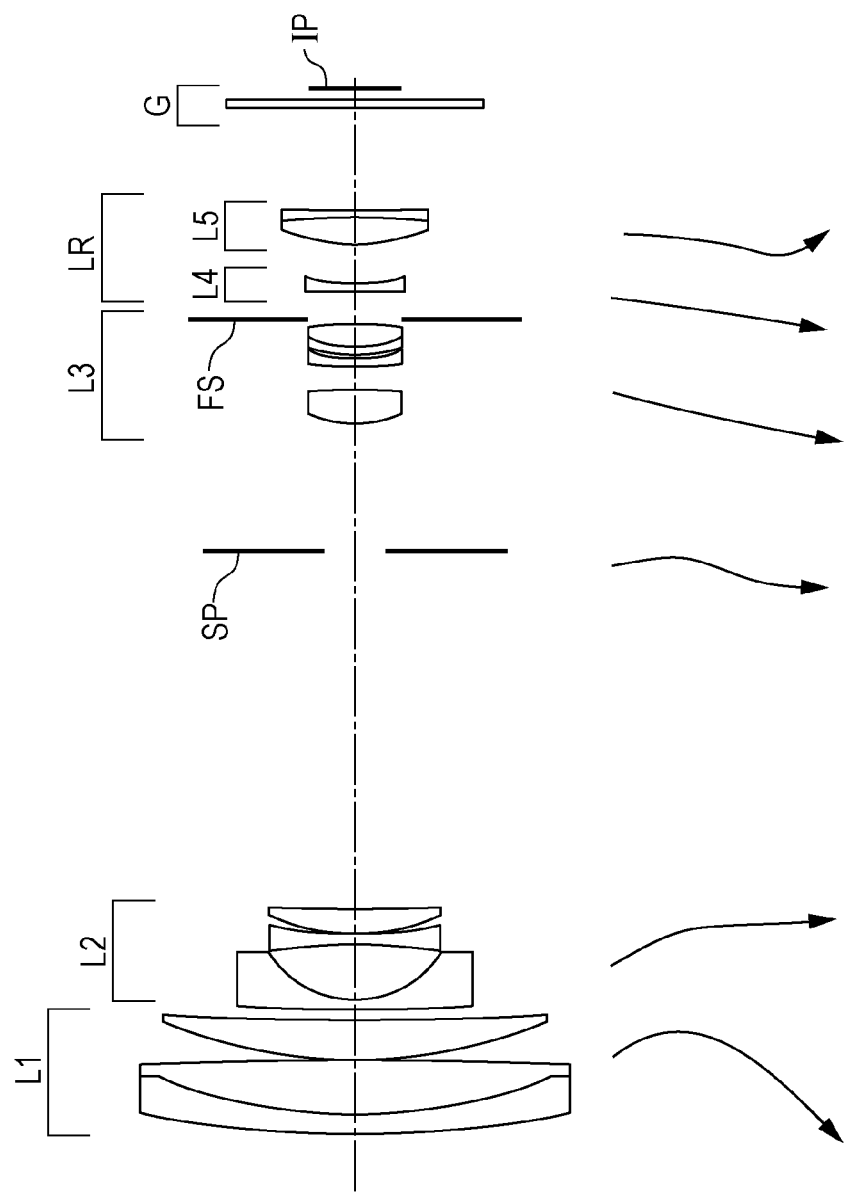
FIG. 15 is a sectional view of a zoom lens according to an eighth embodiment of the present invention at the wide angle end.
Figure 16B:
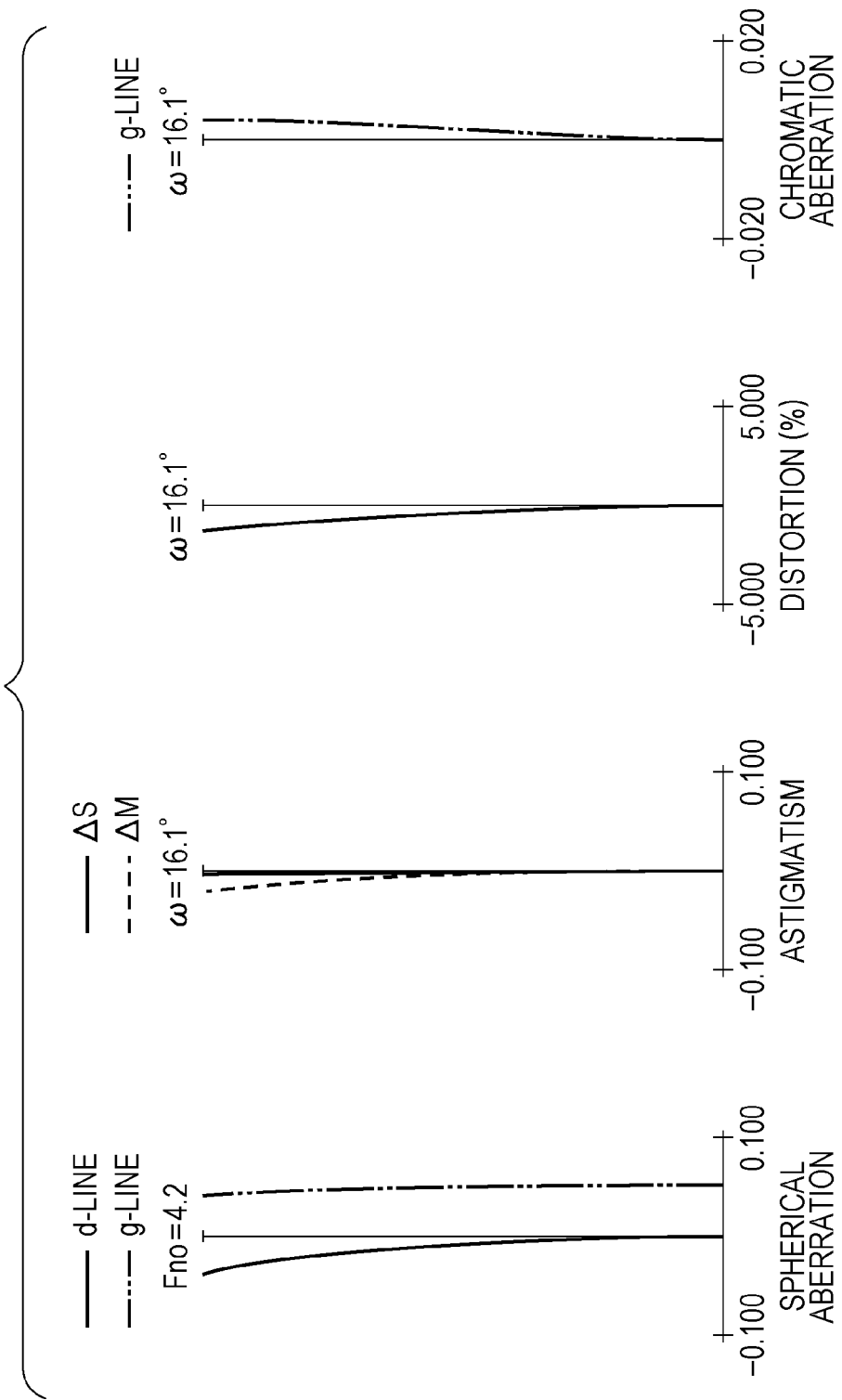

FIG. 13 is a sectional view of a zoom lens according to a seventh embodiment of the present invention at the wide angle end. FIGS. 14A, 14B, and 14C are aberration diagrams of the zoom lens according to the seventh embodiment at the wide angle end, an intermediate zooming position, and the telephoto end, respectively. FIG. 15 is a sectional view of a zoom lens according to an eighth embodiment of the present invention at the wide angle end. FIGS. 16A, 16B, and 16C are aberration diagrams of the zoom lens according to the eighth embodiment at the wide angle end, an intermediate zooming position, and the telephoto end, respectively.

Figure 17:
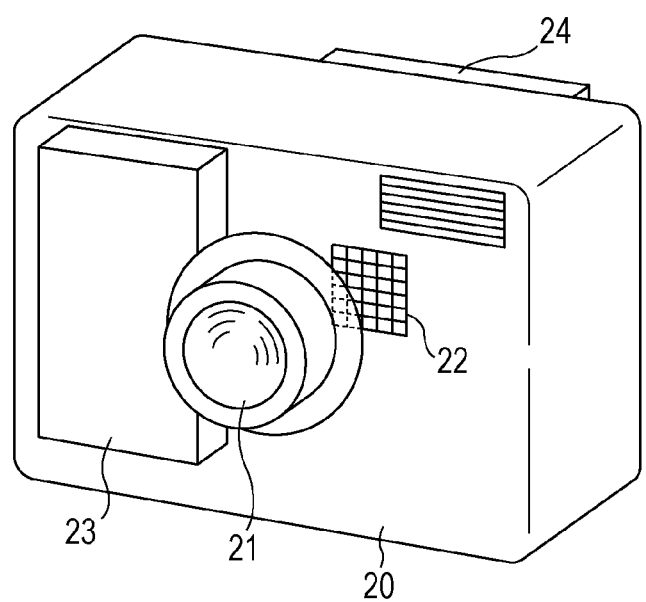
FIG. 17 is a schematic diagram illustrating the main part of an image pickup apparatus according to an embodiment of the present invention.

FIG. 17 is a schematic diagram illustrating the main part of a camera (image pickup apparatus) including a zoom lens according to an embodiment of the present invention. The zoom lens of each embodiment serves as an imaging lens system for use in an image pickup apparatus, such as a video camera, a digital camera, a TV camera, a monitoring camera, or a film camera. In the sectional views, the object side (front) is at the left and the image side (rear) is at the right. In addition, i shows the number of each lens unit counted from the object side, and Li denotes the $i^{th}$ lens unit. LR denotes the rear lens group including one or more lens units.

In the sectional views of FIGS. 1, 3, 9, 13, and 15 illustrating the first, second, fifth, seventh, and eighth embodiments, respectively, L1 denotes a first lens unit having a positive refractive power, L2 denotes a second lens unit having a negative refractive power, L3 denotes a third lens unit having a positive refractive power, L4 denotes a fourth lens unit having a negative refractive power, and L5 denotes a fifth lens unit having a positive refractive power. The zoom lenses according to the first, second, fifth, seventh, and eighth embodiments are five-unit zoom lenses.

In the sectional views of FIGS. 5 and 7 illustrating the third and fourth embodiments, respectively, L1 denotes a first lens unit having a positive refractive power, L2 denotes a second lens unit having a negative refractive power, L3 denotes a third lens unit having a positive refractive power, and L4 denotes a fourth lens unit having a positive refractive power. The zoom lenses according to the third and fourth embodiments are four-unit zoom lenses.

In the sectional view of FIG. 11 illustrating the sixth embodiment, L1 denotes a first lens unit having a positive refractive power, L2 denotes a second lens unit having a negative refractive power, L3 denotes a third lens unit having a positive refractive power, L4 denotes a fourth lens unit having a positive refractive power, and L5 denotes a fifth lens unit having a positive refractive power. The zoom lens according to the sixth embodiment is a five-unit zoom lens. The rear lens group LR includes two lens units in the first, second, and fifth to eight embodiments, and includes a single lens unit in the third and fourth embodiments.

In each embodiment, an aperture stop SP that determines an F-number light beam is arranged on the object side of the third lens unit L3. The aperture stop SP is moved along a locus different from those of the lens units during zooming. The diameter of the aperture stop SP is not necessarily fixed and may instead be varied during zooming. In such a case, upper-line coma flare due to off-axis light, which increases at the wide angle end, can be minimized and the optical performance can be improved.

A mechanical stop (flare cut stop) FS is arranged on the image side of the third lens unit L3 and serves to block unnecessary light (flare). The opening diameter of the mechanical stop FS is fixed. The mechanical stop FS blocks undesirable light that degrades the optical performance. The opening diameter of the mechanical stop FS is set as small as possible within a range in which the axial principal ray is not cut at the telephoto end, so that the upper-line coma flare due to off-axis light can be minimized over the entire zoom range. Thus, the optical performance can be easily improved over the entire zoom range.

According to the present embodiment, the mechanical stop FS is moved together with the third lens unit L3 during zooming. However, the mechanical stop FS may instead be moved along a locus that differs from that of the third lens unit L3 or be fixed during zooming. G denotes an optical block that corresponds to, for example, an optical filter, a faceplate, a quartz low-pass filter, or an infrared-cut filter. IP denotes an image plane, which is an image plane of a solid-state image pickup device (photoelectric transducer), such as a CCD sensor or a CMOS sensor, when the zoom lens is used as an image pickup optical system of a video camera or a digital still camera. When the zoom lens is included in a film camera, a photosensitive surface that corresponds to a film surface is placed on the image plane IP.

In the aberration diagrams, the solid line and the two-dot chain line in the graphs of spherical aberration represent a d-line and a g-line, respectively, and the dotted line and the solid line in the graphs of astigmatism represent a meridional image plane and a sagittal image plane, respectively. The lateral chromatic aberration is represented by the g-line. Omega (ω) represents the half angle of view (half the image-taking angle of view) (degrees), and Fno represents the F number. In each of the embodiments described below, the wide-angle end and the telephoto end are zooming positions corresponding to the states in which a magnification-varying lens unit is at one and the other ends of a mechanically moveable range on an optical axis. In each embodiment, the lens units are moved as shown by the arrows during zooming from the wide angle end to the telephoto end.

In each embodiment, the distance between the second lens unit L2 and the third lens unit L3 at the telephoto end is defined as Dt23. The focal lengths of the entire optical system at the wide angle end and the telephoto end are defined as fw and ft, respectively. The focal length of the second lens unit L2 is defined as f2. The amount of movement of the second lens unit L2 in the optical axis direction during zooming from the wide angle end to the telephoto end is defined as M2. The amount of movement of a lens unit in the optical axis direction during zooming from the wide angle end to the telephoto end is the difference between the positions of the lens unit at the wide angle end and the telephoto end in the optical axis direction. The sign of the amount of movement is positive when the lens unit is moved so as to be positioned closer to the object side at the telephoto end than at the wide angle end. Here, the following conditional expressions are satisfied:

$$Dt23/\sqrt{fw*ft} < 0.09 \quad (1)$$

$$0.01 < |f2|/ft < 0.10 \quad (2)$$

$$-5.00 < M2/|f2| < -0.70 \quad (3)$$

The zoom lens of each embodiment includes, in order from the object side to the image side, a first lens unit having a positive refractive power, a second lens unit having a negative refractive power, a third lens unit having a positive refractive power, and a rear lens group including one or more lens units. During zooming from the wide angle end to the telephoto end, the first lens unit is moved so as to be positioned closer to the object side at the telephoto end than at the wide angle end, and the second lens unit L2 is moved so as to be positioned closer to the image side at the telephoto end than at the wide angle end.

With the above-described structure, in the zoom lens of each embodiment, the off-axis light passes through the first lens unit L1 at a position separated from the optical axis at the wide angle end, and the position at which the off-axis light is incident on the first lens unit L1 gradually approaches the optical axis as the zooming position approaches the telephoto end. Accordingly, the off-axis aberration is appropriately corrected at the wide angle end. In addition, since the first lens unit is moved toward the object side during zooming from the wide angle end to the telephoto end, the distance between the first lens unit L1 and the second lens unit L2 is increased at the telephoto end. Thus, the focal length of the entire optical system is increased. In other words, the zoom ratio is increased.

During zooming from the wide angle end to the telephoto end, the second lens unit L2 is moved so as to be positioned closer to the image side at the telephoto end than at the wide angle end. Accordingly, the magnification-varying function is enhanced while the amount of movement of the third lens unit during zooming at the wide angle side is suppressed. Since the second lens unit L2 is moved toward the image side, it is not necessary to move the first lens unit L1 largely toward the object side. Thus, owing to the movement of the second lens unit L2, the zoom ratio can be increased without increasing the overall lens length at the telephoto side.

During zooming from the wide angle end to the telephoto end, the first lens unit L1 is moved along a locus that is convex toward the image side so that the first lens unit L1 and the entrance pupil approach each other at the wide angle end, at which the effective diameter of the front lens is at a maximum, or a zooming position slightly shifted toward the telephoto side from the wide angle end. Since the first lens unit L1 is moved along the locus that is convex toward the image side, the effective diameter of the front lens can be reduced and the sharp reduction in the amount of light in a peripheral region around the image area can be suppressed.

Conditional Expression (1) limits the distance between the second lens unit L2 and the third lens unit L3 at the telephoto end. When the distance is too large such that the value of Conditional Expression (1) is above the upper limit thereof, the overall lens length at the telephoto end increases. In addition, the distance between the aperture stop SP and the first lens unit L1 at the telephoto end also increases, and the effective diameter of the front lens increases accordingly.

Conditional Expression (2) limits the focal length of the second lens unit L2. When the focal length of the second lens unit L2 is too large such that the value of Conditional Expression (2) is above the upper limit thereof, the amount of movement of the first lens unit L1 during zooming is increased when the zoom ratio is to be increased. As a result, the overall lens length at the telephoto end increases. When the focal length of the second lens unit L2 is too small such that the value of Conditional Expression (2) is below the lower limit thereof, the Petzval sum increases in the negative direction, and the field curvature increases accordingly.

Conditional Expression (3) limits the amount of movement of the second lens unit L2 in the optical axis direction during zooming from the wide angle end to the telephoto end. When the value of Conditional Expression (3) is below the lower limit thereof, contribution of the second lens unit L2 to magnification variation becomes too small. As a result, it becomes difficult to obtain a desired zoom ratio and variation in spherical aberration during zooming increases. When the value of Conditional Expression (3) is above the upper limit thereof, contribution of the second lens unit L2 to magnification variation becomes too large. As a result, distortion aberration increases at the wide angle end and it becomes difficult to obtain high optical performance.

Accordingly, each of the above-described embodiments provides a small high-zoom-ratio zoom lens having high optical performance over the entire zoom range.

In each embodiment, one or more of the conditions provided below can be satisfied. The lateral magnification of the second lens unit L2 at the wide angle end is defined as $\beta 2w$, and the lateral magnification of the second lens unit L2 at the telephoto end is defined as $\beta 2t$. The total thickness of the lens units included in the entire optical system (the sum of the thicknesses of all of the lens units included in the zoom lens) is defined as Tsum. The focal length of the first lens unit L1 is defined as f1. The focal length of the third lens unit L3 is defined as 3. The amount of movement of the first lens unit L1 in the optical axis direction during zooming from the wide angle end to the telephoto end is defined as M1. In this case, one or more of the following conditional expressions can be satisfied.

$$5.00 < \beta 2t/\beta 2w < 20.00 \quad (4)$$

$$T\text{sum}/ft < 0.50 \quad (5)$$

$$0.30 < |f2|/f3 < 0.80 \quad (6)$$

$$8.00 < f1/fw < 35.00 \quad (7)$$

$$5.00 < M1/fw < 25.00 \quad (8)$$

$$0.01 < f3/ft < 0.25 \quad (9)$$

$$15.00 < ft/fw < 120.00 \quad (10)$$

The technical meaning of each of the conditional expressions will now be described.

Conditional Expression (4) appropriately limits the lateral magnifications $\beta 2t$ and $\beta 2w$ of the second lens unit L2 at the wide angle end and the telephoto end, respectively, for obtaining a small zoom lens having a high zoom ratio. When the lateral magnification $\beta 2t$ of the second lens unit L2 at the telephoto end is too large relative to the lateral magnification $\beta 2w$ of the second lens unit L2 at the wide angle end such that the value of Conditional Expression (4) is above the upper limit thereof, the amount of movement of the second lens unit during zooming increases. As a result, the overall lens length increases and the size of the entire optical system increases accordingly.

When the lateral magnification $\beta 2t$ of the second lens unit L2 at the telephoto end is too small relative to the lateral magnification $\beta 2w$ of the second lens unit L2 at the wide angle end such that the value of Conditional Expression (4) is below the lower limit thereof, it becomes difficult to correct the coma aberration and image plane variation over the entire zoom range. In addition, the effective diameter of the front lens increases, and it becomes difficult to reduce the size of the entire optical system.

Conditional Expression (5) defines a condition for achieving both a reduction in the overall lens length and an improvement of the optical performance. When the value of Conditional Expression (5) is above the upper limit thereof, the optical performance can be appropriately improved. However, it becomes difficult to reduce the size of the entire optical system.

Conditional Expression (6) defines a condition for appropriately setting the ratio between the focal lengths of the second lens unit L2 and the third lens unit L3, which contribute to magnification variation, while reducing the size of the entire optical system. When the negative refractive power of the second lens unit L2 is too small such that the value of Conditional Expression (6) is above the upper limit thereof, it becomes difficult to reduce the overall lens length and the effective diameter of the front lens. In addition, the third lens unit L3 is required to largely contribute to magnification variation when the zoom ratio is to be increased. As a result, the coma aberration mainly increases and the optical performance is degraded.

When the negative refractive power of the second lens unit L2 is too high such that the value of Conditional Expression (6) is smaller than the lower limit thereof, the sensitivity (ratio of variation in focus position to variation in position) increases, and it becomes difficult to reduce the size of the entire optical system. In addition, it becomes difficult to correct the aberrations, such as the field curvature and astigmatism, over the entire zoom range.

Conditional Expression (7) defines a condition for achieving a reduction in the size of the entire optical system and an improvement of the optical performance in a balanced manner by limiting the focal length of the first lens unit L1 and appropriately setting the refractive power of the first lens unit L1. When the refractive power of the first lens unit L1 is too high such that the value of Conditional Expression (7) is below the lower limit thereof, the first lens unit L1 causes large spherical aberration and axial chromatic aberration, and it becomes difficult to obtain appropriate image forming performance.

When the refractive power of the first lens unit L1 is too low such that the value of Conditional Expression (7) is above the upper limit thereof, the aberrations can be easily corrected. However, the amount of relative movement between the first lens unit L1 and the second lens unit L2 for achieving the desired zoom ratio increases. As a result, the overall lens length and the effective diameter of the front lens increase.

Conditional Expression (8) limits the amount of movement of the first lens unit L1 during zooming. When the amount of movement toward the object side during zooming from the wide angle end to the telephoto end is too small such that the value of Conditional Expression (8) is below the lower limit thereof, the magnification varying function is reduced. If the refractive power of the first lens unit L1 is increased to compensate for the reduction in magnification varying function, the spherical aberration increases at the telephoto side. If the refractive power of the second lens unit L2 is increased to compensate for the reduction in magnification varying function, the field curvature increases at the wide angle side and the spherical aberration increases at the telephoto side.

When the amount of movement toward the object side during zooming from the wide angle end to the telephoto end is too large such that the value of Conditional Expression (8) is above the upper limit thereof, the overall lens length at the telephoto end increases and it becomes difficult to reduce the size of the entire optical system.

Conditional Expression (9) limits the refractive power of the third lens unit L3 for reducing mainly the spherical aberration and coma aberration and increasing the view angle. When the refractive power of the third lens unit L3 is too low such that the value of Conditional Expression (9) is above the upper limit thereof, the amount of movement of the third lens unit L3 during zooming must be increased to achieve the desired zoom ratio, and it becomes difficult to reduce the overall lens length. It also becomes difficult to achieve a high zoom ratio. When the refractive power of the third lens unit L3 is too high such that the value of Conditional Expression (9) is below the lower limit thereof, the zoom ratio can be easily increased. However, the spherical aberration, the coma aberration, etc., are increased and cannot be easily corrected.

Conditional Expression (10) defines an appropriate zoom ratio. When the zoom ratio is set so as not to be below the lower limit of Conditional Expression (10), both a reduction in the size of the entire optical system and an increase in the zoom ratio can be easily achieved. When the zoom ratio is set so as not to be above the upper limit of Conditional Expression (10), the refractive power of each lens unit does not become too high and it is not necessary to increase the thickness of each lens unit to correct the aberrations. As a result, the size of the entire optical system can be easily reduced. In an embodiment of the present invention, the numerical ranges of Conditional Expressions (1) to (9) can be changed as follows.

$$0.01 < Dt23/\sqrt{fw*ft} < 0.09 \quad (1a)$$

$$0.02 < |f2|/ft < 0.10 \quad (2a)$$

$$-4.00 < M2/|f2| < -0.90 \quad (3a)$$

$$6.00 < \beta 2t/\beta 2w < 18.00 \quad (4a)$$

$$0.05 < T\text{sum}/ft < 0.50 \quad (5a)$$

$$0.35 < |f2|/f3 < 0.70 \quad (6a)$$

$$10.00 < f1/fw < 30.00 \quad (7a)$$

$$6.00 < M1/fw < 20.00 \quad (8a)$$

$$0.01 < f3/ft \leq 0.20 \quad (9a)$$

Conditional Expression (1a) is obtained by adding a lower limit to Conditional Expression (1).

When the variation in the distance between the second lens unit L2 and the third lens unit L3 is too small such that the value of Conditional Expression (1a) is below the lower limit thereof, it becomes necessary to increase the optical power of each lens unit to obtain a predetermined zoom ratio. As a result, it becomes difficult to appropriately correct the aberrations over the entire zoom range.

Conditional Expression (5a) is obtained by adding a lower limit to Conditional Expression (5). When the value of Conditional Expression (5a) is below the lower limit thereof, the overall lens length can be easily reduced. However, the aberration correcting performance of each lens is degraded and, in particular, the axial chromatic aberration is increased at the telephoto end. As a result, it becomes difficult to obtain high optical performance. In each of the above conditional expressions having the narrower ranges, the upper or lower limit can be replaced by the upper or lower limit of the corresponding one of the conditional expressions having the broader ranges.

The effect of embodiments of the present invention can be enhanced by combining any of the above-described conditional expressions. The first lens unit may include, in order from the object side to the image side, a negative lens, a positive lens, and a positive lens. In such a case, the zoom ratio can be increased while the spherical aberration and chromatic aberration are reduced, and the optical performance can be easily increased.

An image pickup apparatus according to an embodiment of the present invention includes one of the above-described zoom lenses and a circuit that electrically corrects one or both of the distortion aberration and the lateral chromatic aberration.

When the zoom lens is allowed to have the distortion aberration as in this case, the size of the zoom lens can be easily reduced by reducing the number of lenses included in the zoom lens. In addition, when the lateral chromatic aberration is electrically corrected, color bleed of the captured image can be reduced and the resolving power can be easily increased.

The characteristic of the lens structure according to each embodiment will now be described. The zoom lenses according to the first, second, fifth, seventh, and eighth embodiments each include, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The rear lens group LR includes the fourth lens unit L4 and the fifth lens unit L5.

Each of the lens units L1 to L5 is moved during zooming from the wide angle end to the telephoto end. Specifically, the first lens unit L1 is moved along a locus that is convex toward the image side. The second lens unit L2 is moved toward the image side, and the third lens unit L3 and the fourth lens unit L4 are moved toward the object side. The fifth lens unit L5 is moved along a locus that is convex toward the object side.

The lens units are moved so that the distance between the first lens unit L1 and the second lens unit L2, the distance between the third lens unit L3 and the fourth lens unit L4, and the distance between the fourth lens unit L4 and the fifth lens unit L5 are larger at the telephoto end than at the wide angle end and so that the distance between the second lens unit L2 and the third lens unit L3 is smaller at the telephoto end than at the wide angle end.

The second lens unit L2 includes, in order from the object side to the image side, a negative lens, a negative lens, and a positive lens. The third lens unit L3 includes, in order from the object side to the image side, a positive lens, a negative lens, a negative lens, and a positive lens. The fourth lens unit L4 includes a single negative lens. The fifth lens unit L5 includes a cemented lens including a positive lens and a negative lens. The zoom lenses according to the third and fourth embodiments each include, in order from the object side to the image side, a first lens unit L1 having a positive refractive power, a second lens unit L2 having a negative refractive power, a third lens unit L3 having a positive refractive power, and a fourth lens unit L4 having a positive refractive power. The rear lens group LR includes the fourth lens unit L4.

Each of the lens units L1 to L4 is moved during zooming from the wide angle end to the telephoto end. Specifically, the first lens unit L1 is moved along a locus that is convex toward the image side. The second lens unit L2 is moved toward the image side, and the third lens unit L3 are moved toward the object side. The fourth lens unit L4 is moved along a locus that is convex toward the object side. The lens units are moved so that the distance between the first lens unit L1 and the second lens unit L2 is larger at the telephoto end than at the wide angle end, the distance between the second lens unit L2 and the third lens unit L3 is smaller at the telephoto end than at the wide angle end, and the distance between the third lens unit L3 and the fourth lens unit L4 is larger at the telephoto end than at the wide angle end.

The second lens unit L2 includes a negative lens, a negative lens, a negative lens, and a positive lens. The third lens unit L3 includes a positive lens, a negative lens, a negative lens, a positive lens, and a negative lens, or a positive lens, a negative lens, and a positive lens. The fourth lens unit L4 includes a single positive lens or a positive lens, a positive lens, and a negative lens.

The zoom lens according to the sixth embodiment includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The rear lens group LR includes the fourth lens unit L4 and the fifth lens unit L5.

Each of the lens units L1 to L5 is moved during zooming from the wide angle end to the telephoto end. Specifically, the first lens unit L1 is moved along a locus that is convex toward the image side. The second lens unit L2 is moved toward the image side, and the third lens unit L3 and the fourth lens unit L4 are moved toward the object side. The fifth lens unit L5 is moved along a locus that is convex toward the object side.

The lens units are moved so that the distance between the first lens unit L1 and the second lens unit L2, the distance between the third lens unit L3 and the fourth lens unit L4, and the distance between the fourth lens unit L4 and the fifth lens unit L5 are larger at the telephoto end than at the wide angle end and so that the distance between the second lens unit L2 and the third lens unit L3 is smaller at the telephoto end than at the wide angle end.

The second lens unit L2 includes a negative lens, a negative lens, and a positive lens. The third lens unit L3 includes a positive lens, a negative lens, a negative lens, a positive lens, and a negative lens. The fourth lens unit L4 includes a single positive lens. The fifth lens unit L5 includes a cemented lens including a positive lens and a negative lens.

In each of the zoom lenses according to the embodiments, an F-number determining member (aperture stop) SP is disposed between the second lens unit L2 and the third lens unit L3. The F-number determining member SP is moved independently of (along a locus different from those of) the other lens units during zooming in each embodiment. According to this structure, the sharp reduction in the amount of light in a peripheral region around the image area from that at an intermediate image height can be suppressed at the wide angle end and a zooming position near the wide angle end. The F-number determining member SP may instead be moved together with the third lens unit L3 during zooming.

In each of the zoom lenses according to the embodiments, the refractive power of the first lens unit L1 is reduced (within a range in which Conditional Expression (7) is satisfied). In addition, the refractive power of the second lens unit L2 is somewhat increased (within a range in which Conditional Expression (6) is satisfied) to reduce the distance between the first lens unit L1 and the F-number determining member SP. Accordingly, the diameter of the first lens unit L1 is reduced. In addition, the refractive power of the third lens unit L3 is somewhat increased (within a range in which Conditional Expression (9) is satisfied) to reduce the distance between the aperture stop SP and the image plane IP. Accordingly, the overall lens length at the wide angle end is reduced.

In each of the zoom lenses according to the embodiments, the magnification varying function is achieved by moving the first lens unit L1 toward the object side during zooming from the wide angle end to the telephoto end so that the distance between the first lens unit L1 and second lens unit L2 is larger at the telephoto end than at the wide angle end.

The magnification varying function is also achieved by moving the third lens unit L3 toward the object side during zooming from the wide angle end to the telephoto end so that the distance between the second lens unit L2 and the third lens unit L3 is smaller at the telephoto end than at the wide angle end. Thus, the magnification varying function is provided by a plurality of parts of the zoom lens, so that the zoom ratio is increased while the movement stroke for the magnification variation and the overall lens length at the telephoto end are reduced.

Focusing from an object at infinity to a close object is performed by moving the final lens unit toward the object side. With the above-described structure, the overall lens length is reduced at the wide angle end and the telephoto end and the zoom ratio is increased at the same time. In each embodiment, the third lens unit L3 may include an aspherical lens. In such a case, the spherical aberration, the coma aberration, etc., can be appropriately corrected at the wide angle side while certain brightness is ensured.

In the fifth, sixth, and seventh embodiments, the second lens unit L2 includes an aspherical lens to further improve the optical performance. In particular, the field curvature is suppressed at the wide angle side. In the fifth, sixth, and seventh embodiments, the negative lens that is closest to the object side in the second lens unit has an aspherical shape such that the negative refractive power decreases at the periphery of the lens. Accordingly, the field curvature can be appropriately corrected.

A digital camera (image pickup apparatus) including a zoom lens according to an embodiment of the present invention as an image pickup optical system will now be described with reference to FIG. 17. Referring to FIG. 17, a digital camera body 20 includes an image pickup optical system 21 including the zoom lens according to any of the above-described embodiments; an image pickup device 22, such as a CCD, for receiving an object image through the image pickup optical system 21; a recording unit 23 that records the object image received by the image pickup device 22; and a finder 24 that allows a user to observe the object image displaced on a display element (not shown). The display element is formed of, for example, a liquid crystal panel, and displays the object image formed on the image pickup device 22.

A small image pickup apparatus, such as a digital camera, having high optical performance can be realized by using the zoom lens according to any of the embodiments of the present invention.

Although the embodiments of the present invention are described above, the present invention is not limited to the above-described embodiments, and various modifications and alterations are possible within the scope of the present invention.

First to eighth numerical examples corresponding to the first to eighth embodiments of the present invention will now be described. In each numerical example, i represents the number of each optical surface counted from the object side, ri represents the radius of curvature of the $i^{th}$ optical surface ($i^{th}$ surface), di represents the distance between the $i^{th}$ surface and the $(i+1)^{th}$ surface, and ndi and vdi respectively represent the refractive index and the Abbe number of the material of the $i^{th}$ optical component with respect to the d-line.

When k is the eccentricity, A4, A6, A8, A10, and A12 are aspheric surface coefficients, and the displacement from the surface vertex in the optical axis direction at a height h from the optical axis is x, the shape of an aspherical surface can be expressed as follows:

$$x=(h^2/R)/[1+[1-(1+k)(h/R)^2]^{1/2}]+A4h^4+A6h^6+A8h^8+A10h^{10}+A12h^{12}$$

Here, R is the paraxial radius of curvature. In addition, for example, "E-Z" means "10-Z." In each numerical example, the last two surfaces are surfaces of an optical block, such as a filter or a faceplate.

In each numerical example, a back focus (BF) is a distance between the final lens surface and a paraxial image plane expressed in terms of an equivalent air length. The overall lens length is the sum of the distance between the surface closest to the object side and the final lens surface and the back focus. Table 1 shows the values of the above-described conditional expressions in each of the numerical examples.

FIRST NUMERICAL EXAMPLE

Surface Data

| Surface Number | r | d | nd | vd |
|---|---|---|---|---|
| 1 | 90.708 | 1.45 | 1.91082 | 35.3 |
| 2 | 49.795 | 5.25 | 1.49700 | 81.5 |
| 3 | −190.397 | 0.05 | | |
| 4 | 41.126 | 3.30 | 1.49700 | 81.5 |
| 5 | 123.046 | (variable) | | |
| 6 | 179.721 | 0.75 | 1.83481 | 42.7 |
| 7 | 8.496 | 5.18 | | |
| 8 | −31.844 | 0.60 | 1.77250 | 49.6 |
| 9 | 31.844 | 0.16 | | |
| 10 | 17.277 | 1.95 | 1.95906 | 17.5 |
| 11 | 59.314 | (variable) | | |
| 12 (stop) | ∞ | (variable) | | |
| 13* | 10.093 | 2.70 | 1.55332 | 71.7 |
| 14* | −160.645 | 2.04 | | |
| 15 | 28.628 | 0.60 | 1.80400 | 46.6 |
| 16 | 10.527 | 0.35 | | |
| 17 | 15.210 | 0.60 | 2.00100 | 29.1 |
| 18 | 10.945 | 2.40 | 1.49700 | 81.5 |
| 19 | −25.732 | 1.07 | | |
| 20 | ∞ | (variable) | | |
| 21 | 115.143 | 0.70 | 1.48749 | 70.2 |
| 22 | 24.705 | (variable) | | |
| 23 | 25.060 | 2.20 | 1.88300 | 40.8 |
| 24 | −25.060 | 0.50 | 2.00069 | 25.5 |
| 25 | −2946.068 | (variable) | | |
| 26 | ∞ | 0.80 | 1.51633 | 64.1 |
| 27 | ∞ | 1.0 | | |
| image plane | ∞ | | | |

Aspherical Surface Data

13th surface

K = −2.70434e−001    A4 = −5.69285e−005    A6 = −5.23498e−008
A8 = −8.93644e−010

14th surface

K = 0.00000e+000    A4 = 2.46102e−005    A6 = 1.73290e−008

Various Data
Zoom Ratio 47.51

| | Wide Angle | Intermediate | Telephoto |
|---|---|---|---|
| Focal Length | 4.42 | 14.21 | 210.00 |
| F-number | 3.50 | 4.71 | 6.69 |
| Field Angle | 37.01 | 15.25 | 1.06 |
| Image Height | 3.33 | 3.88 | 3.88 |
| Overall Lens Length | 97.00 | 95.39 | 138.53 |
| BF | 11.44 | 19.83 | 10.00 |
| d5 | 0.75 | 16.57 | 61.72 |
| d11 | 36.13 | 14.08 | 1.05 |
| d12 | 9.95 | 3.01 | 0.35 |
| d20 | 1.78 | 4.91 | 8.04 |
| d22 | 4.83 | 4.88 | 25.25 |
| d25 | 9.91 | 18.30 | 8.47 |

Zoom Lens Unit Data

| Unit No. | Front Surface | Focal Length |
|---|---|---|
| 1 | 1 | 80.35 |
| 2 | 6 | −9.38 |
| 3 | 13 | 19.69 |
| 4 | 21 | −64.69 |
| 5 | 23 | 32.20 |

SECOND NUMERICAL EXAMPLE

Surface Data

| Surface Number | r | d | nd | vd |
|---|---|---|---|---|
| 1 | 101.721 | 1.30 | 1.80610 | 33.3 |
| 2 | 44.521 | 4.58 | 1.49700 | 81.5 |
| 3 | −554.834 | 0.18 | | |
| 4 | 43.808 | 3.44 | 1.60311 | 60.6 |
| 5 | 224.609 | (variable) | | |
| 6 | 132.874 | 0.70 | 1.83481 | 42.7 |
| 7 | 8.358 | 4.65 | | |
| 8 | −32.141 | 0.55 | 1.77250 | 49.6 |
| 9 | 26.500 | 0.20 | | |
| 10 | 16.536 | 1.99 | 1.92286 | 18.9 |
| 11 | 79.590 | (variable) | | |
| 12 (stop) | ∞ | (variable) | | |
| 13* | 9.519 | 3.03 | 1.55332 | 71.7 |
| 14* | −67.520 | 2.30 | | |
| 15 | 24.912 | 0.55 | 1.64769 | 33.8 |
| 16 | 8.916 | 0.28 | | |
| 17 | 12.394 | 0.50 | 1.84666 | 23.9 |
| 18 | 9.266 | 1.90 | 1.51633 | 64.1 |
| 19 | −29.706 | 0.30 | | |
| 20 | ∞ | (variable) | | |
| 21 | −39.092 | 0.70 | 1.48749 | 70.2 |
| 22 | 12.666 | (variable) | | |
| 23 | 17.121 | 2.88 | 1.83481 | 42.7 |
| 24 | −22.608 | 0.45 | 1.94595 | 18.0 |
| 25 | −64.627 | (variable) | | |
| 26 | ∞ | 0.60 | 1.51633 | 64.1 |
| 27 | ∞ | 1.01 | | |
| image plane | ∞ | | | |

Aspherical Surface Data

13th surface

K = −1.78888e−001    A4 = −4.01546e−006    A6 = 1.73083e−006
A8 = 1.75668e−008    A10 = 2.62605e−010

14th surface

K = −6.67199e+001    A4 = 1.27460e−004    A6 = 3.44802e−006

Various Data
Zoom Ratio 28.51

| | Wide Angle | Intermediate | Telephoto |
|---|---|---|---|
| Focal Length | 4.42 | 15.43 | 125.99 |
| F-number | 3.50 | 5.10 | 5.98 |
| Field Angle | 37.01 | 14.09 | 1.76 |
| Image Height | 3.33 | 3.88 | 3.88 |
| Overall Lens Length | 85.36 | 83.81 | 119.36 |
| BF | 8.44 | 12.06 | 7.57 |
| d5 | 0.78 | 15.73 | 56.38 |
| d11 | 29.71 | 10.30 | 0.93 |
| d12 | 8.90 | 1.10 | 0.51 |
| d20 | 2.15 | 8.47 | 10.63 |
| d22 | 4.70 | 5.47 | 12.64 |
| d25 | 7.03 | 10.65 | 6.16 |

Zoom Lens Unit Data

| Unit No. | Front Surface | Focal Length |
|---|---|---|
| 1 | 1 | 77.05 |
| 2 | 6 | −9.51 |
| 3 | 13 | 14.87 |
| 4 | 21 | −19.54 |
| 5 | 23 | 17.37 |

THIRD NUMERICAL EXAMPLE

Surface Data

| Surface Number | r | d | nd | vd |
|---|---|---|---|---|
| 1 | 74.172 | 1.80 | 2.18500 | 16.0 |
| 2 | 56.840 | 6.25 | 1.51633 | 64.1 |
| 3 | −854.616 | 0.20 | | |
| 4* | 39.494 | 4.10 | 1.69680 | 55.5 |
| 5 | 102.106 | (variable) | | |
| 6 | 51.319 | 1.00 | 1.88300 | 40.8 |
| 7 | 10.805 | 2.10 | | |
| 8 | 28.962 | 0.80 | 1.88300 | 40.8 |
| 9 | 9.187 | 3.60 | | |
| 10 | −28.257 | 0.70 | 1.80610 | 33.3 |
| 11 | 68.889 | 0.20 | | |
| 12 | 19.863 | 2.40 | 1.92286 | 18.9 |
| 13 | −111.789 | (variable) | | |
| 14 (stop) | ∞ | (variable) | | |
| 15* | 9.711 | 3.20 | 1.58313 | 59.4 |
| 16* | −43.324 | 2.68 | | |
| 17 | 37.856 | 0.70 | 1.80610 | 33.3 |
| 18 | 9.469 | 0.50 | | |
| 19 | 16.758 | 0.70 | 2.00069 | 25.5 |
| 20 | 8.484 | 2.70 | 1.72000 | 50.2 |
| 21 | −38.034 | 0.31 | | |
| 22 | 128.109 | 0.70 | 1.69680 | 55.5 |
| 23 | 34.694 | 0.30 | | |
| 24 | ∞ | (variable) | | |
| 25 | 19.526 | 1.80 | 1.58313 | 59.4 |
| 26 | −693.280 | (variable) | | |
| 27 | ∞ | 1.10 | 1.51633 | 64.1 |
| 28 | ∞ | 1.15 | | |
| image plane | ∞ | | | |

Aspherical Surface Data

4th surface

K = −1.76307e−003    A4 = −9.93865e−008    A6 = −2.90526e−011
A8 = −3.84237e−015    A10 = −2.28856e−015

15th surface

K = −4.42240e−001    A4 = −8.40186e−005    A6 = 4.16653e−007
A8 = −7.35921e−008    A10 = 2.12069e−009

16th surface

K = −6.28357e−007    A4 = 4.33153e−007    A6 = 5.61637e−008
A8 = −6.14980e−011    A10 = −4.01133e−013

Various Data
Zoom Ratio 18.90

| | Wide Angle | Intermediate | Telephoto |
|---|---|---|---|
| Focal Length | 5.17 | 27.25 | 97.78 |
| F-number | 2.83 | 3.89 | 5.48 |
| Field Angle | 36.83 | 8.09 | 2.27 |
| Image Height | 3.88 | 3.88 | 3.88 |
| Overall Lens Length | 85.40 | 94.92 | 117.12 |
| BF | 10.04 | 19.40 | 12.42 |
| d5 | 0.70 | 27.64 | 40.81 |
| d13 | 25.54 | 5.38 | 1.17 |
| d14 | 7.50 | 2.43 | 0.75 |
| d24 | 4.49 | 2.96 | 24.85 |
| d26 | 8.16 | 17.52 | 10.54 |

Zoom Lens Unit Data

| Unit No. | Front Surface | Focal Length |
|---|---|---|
| 1 | 1 | 63.34 |
| 2 | 6 | −9.22 |
| 3 | 15 | 19.31 |
| 4 | 25 | 32.60 |

FOURTH NUMERICAL EXAMPLE

Surface Data

| Surface Number | r | d | nd | vd |
|---|---|---|---|---|
| 1 | 123.517 | 1.80 | 1.83400 | 37.2 |
| 2 | 49.043 | 6.00 | 1.49700 | 81.5 |
| 3 | −173.716 | 0.20 | | |
| 4 | 41.868 | 3.50 | 1.59282 | 68.6 |
| 5 | 126.408 | (variable) | | |
| 6 | 103.274 | 1.00 | 1.94000 | 36.0 |
| 7 | 8.518 | 3.10 | | |
| 8 | 32.657 | 0.70 | 1.83481 | 42.7 |
| 9 | 15.173 | 2.00 | | |
| 10 | −53.198 | 0.70 | 1.77250 | 49.6 |
| 11 | 32.604 | 0.20 | | |
| 12 | 16.861 | 1.80 | 1.92286 | 18.9 |
| 13 | 219.777 | (variable) | | |
| 14 (stop) | ∞ | (variable) | | |
| 15* | 9.446 | 3.30 | 1.55332 | 71.7 |
| 16* | −148.505 | 2.00 | | |
| 17 | 23.123 | 1.30 | 1.83481 | 42.7 |
| 18 | 6.102 | 2.90 | 1.49700 | 81.5 |
| 19 | −61.864 | 0.30 | | |
| 20 | ∞ | (variable) | | |
| 21 | −54.404 | 0.70 | 1.48749 | 70.2 |
| 22 | 26.024 | 2.00 | | |
| 23 | 28.146 | 2.30 | 1.83481 | 42.7 |
| 24 | −13.313 | 0.60 | 1.84666 | 23.8 |
| 25 | −59.884 | (variable) | | |
| 26 | ∞ | 1.00 | 1.51633 | 64.1 |
| 27 | ∞ | 1.00 | | |
| image plane | ∞ | | | |

Aspherical Surface Data

15th surface

K = −1.94279e−001    A4 = −2.44163e−006    A6 = 4.95673e−007
A8 = −2.21380e−008    A10 = 5.49114e−010

16th surface

K = 6.00981e+002    A4 = 1.28301e−004    A6 = 7.08493e−007

Various Data
Zoom Ratio 41.67

| | Wide Angle | Intermediate | Telephoto |
|---|---|---|---|
| Focal Length | 3.91 | 11.88 | 162.78 |
| F-number | 2.87 | 4.93 | 7.07 |
| Field Angle | 40.47 | 18.06 | 1.36 |
| Image Height | 3.33 | 3.88 | 3.88 |
| Overall Lens Length | 93.76 | 93.12 | 128.03 |
| BF | 11.01 | 16.95 | 13.49 |
| d5 | 0.80 | 15.61 | 63.97 |
| d13 | 28.91 | 16.47 | 0.61 |
| d14 | 13.91 | 0.50 | 0.31 |
| d20 | 2.40 | 6.85 | 12.92 |
| d25 | 9.35 | 15.29 | 11.83 |

Zoom Lens Unit Data

| Unit No. | Front Surface | Focal Length |
|---|---|---|
| 1 | 1 | 80.99 |
| 2 | 6 | −8.52 |
| 3 | 15 | 17.99 |
| 4 | 21 | 56.73 |

FIFTH NUMERICAL EXAMPLE

Surface Data

| Surface Number | r | d | nd | vd |
|---|---|---|---|---|
| 1 | 128.900 | 1.20 | 1.80610 | 33.3 |
| 2 | 55.275 | 6.70 | 1.59282 | 68.6 |
| 3 | −314.783 | 0.18 | | |
| 4 | 48.367 | 3.30 | 1.49700 | 81.5 |
| 5 | 138.468 | (variable) | | |
| 6* | 147.547 | 0.70 | 1.88300 | 40.8 |
| 7* | 8.368 | 5.76 | | |
| 8 | −28.770 | 0.70 | 1.77250 | 49.6 |
| 9 | 25.088 | 0.20 | | |
| 10 | 18.269 | 1.85 | 1.92286 | 18.9 |
| 11 | 246.774 | (variable) | | |
| 12 (stop) | ∞ | (variable) | | |
| 13* | 9.741 | 3.10 | 1.55332 | 71.7 |
| 14* | −67.675 | 1.51 | | |
| 15 | 46.120 | 0.60 | 1.64769 | 33.8 |
| 16 | 10.994 | 0.25 | | |
| 17 | 14.282 | 0.70 | 1.80400 | 46.6 |
| 18 | 8.321 | 2.50 | 1.48749 | 70.2 |
| 19 | −26.394 | 0.30 | | |
| 20 | ∞ | (variable) | | |
| 21 | 42.902 | 0.70 | 1.48749 | 70.2 |
| 22 | 15.115 | (variable) | | |
| 23 | 19.837 | 2.50 | 1.78590 | 44.2 |
| 24 | −30.070 | 0.60 | 1.94595 | 18.0 |
| 25 | −228.445 | (variable) | | |
| 26 | ∞ | 0.80 | 1.51633 | 64.1 |
| 27 | ∞ | 1.00 | | |
| image plane | ∞ | | | |

Aspherical Surface Data

16th surface

K = 1.03108e+002  A4 = 1.51950e−005  A6 = −4.06651e−008
A8 = −9.11050e−011

17th surface

K = 5.80956e−002  A4 = −2.38030e−005  A6 = 2.87087e−007
A8 = −5.53044e−009

13th surface

K = 5.43264e−002  A4 = −7.17815e−005  A6 = −5.61355e−007
A8 = −3.51757e−009  A10 = 2.62605e−010

14th surface

K = −3.33931e+001  A4 = 7.99817e−005  A6 = 8.51467e−008

Various Data
Zoom Ratio 38.68

| | Wide Angle | Intermediate | Telephoto |
|---|---|---|---|
| Focal Length | 3.80 | 10.30 | 147.00 |
| F-number | 2.62 | 4.19 | 5.94 |
| Field Angle | 40.58 | 20.62 | 1.51 |
| Image Height | 3.25 | 3.88 | 3.88 |
| Overall Lens Length | 90.76 | 87.72 | 149.92 |
| BF | 9.62 | 15.55 | 14.72 |
| d5 | 0.50 | 11.17 | 69.34 |
| d11 | 28.45 | 14.42 | 0.50 |
| d12 | 12.59 | 1.42 | 1.40 |
| d20 | 2.04 | 3.92 | 15.00 |
| d22 | 3.94 | 7.63 | 15.35 |
| d25 | 8.09 | 14.02 | 13.19 |

Zoom Lens Unit Data

| Unit No. | Front Surface | Focal Length |
|---|---|---|
| 1 | 1 | 91.18 |
| 2 | 6 | −8.77 |
| 3 | 13 | 17.51 |
| 4 | 21 | −48.27 |
| 5 | 23 | 26.00 |

SIXTH NUMERICAL EXAMPLE

Surface Data

| Surface Number | r | d | nd | vd |
|---|---|---|---|---|
| 1 | 123.178 | 1.00 | 1.80610 | 33.3 |
| 2 | 53.710 | 5.65 | 1.49700 | 81.5 |
| 3 | −151.935 | 0.18 | | |
| 4 | 46.687 | 3.00 | 1.59282 | 68.6 |
| 5 | 136.973 | (variable) | | |
| 6* | 224.284 | 0.70 | 1.88300 | 40.8 |
| 7* | 8.432 | 4.48 | | |
| 8 | −34.395 | 0.50 | 1.80400 | 46.6 |
| 9 | 28.199 | 0.20 | | |
| 10 | 16.766 | 2.00 | 1.94595 | 18.0 |
| 11 | 85.065 | (variable) | | |
| 12 (stop) | ∞ | (variable) | | |
| 13* | 9.843 | 3.00 | 1.55332 | 71.7 |
| 14* | −71.895 | 2.09 | | |
| 15 | 24.025 | 0.50 | 1.64769 | 33.8 |
| 16 | 11.017 | 0.35 | | |
| 17 | 17.894 | 0.50 | 1.80400 | 46.6 |
| 18 | 7.506 | 2.40 | 1.48749 | 70.2 |
| 19 | −45.320 | 0.30 | | |
| 20 | −512.184 | 0.50 | 1.43875 | 94.9 |
| 21 | 40.427 | 0.50 | | |
| 22 | ∞ | (variable) | | |
| 23 | 26.209 | 1.50 | 1.48749 | 70.2 |
| 24 | 34.836 | (variable) | | |
| 25 | 28.083 | 2.50 | 1.74950 | 35.3 |
| 26 | −23.563 | 0.50 | 1.94595 | 18.0 |
| 27 | −89.484 | (variable) | | |
| 28 | ∞ | 0.80 | 1.51633 | 64.1 |
| 29 | ∞ | 1.00 | | |
| image plane | ∞ | | | |

Aspherical Surface Data

6th surface

K = −1.05448e+004  A4 = 1.39626e−005  A6 = 3.87206e−007
A8 = −9.23386e−009  A10 = 3.70772e−011  A12 = 6.86907e−014

7th surface

K = 1.28834e−002  A4 = −1.05471e−004  A6 = 3.73155e−006
A8 = −1.97267e−008  A10 = −1.10223e−009  A12 = 6.60991e−012

13th surface

K = −6.17378e−001  A4 = 2.53617e−005  A6 = −2.27818e−006
A8 = −1.35745e−008  A10 = 2.62605e−010

14th surface

K = 1.36688e+002  A4 = 1.10383e−004  A6 = −1.99129e−006

Various Data
Zoom Ratio 43.46

| | Wide Angle | Intermediate | Telephoto |
|---|---|---|---|
| Focal Length | 4.30 | 12.73 | 187.00 |
| F-number | 2.87 | 5.00 | 7.07 |
| Field Angle | 37.76 | 16.94 | 1.19 |
| Image Height | 3.33 | 3.88 | 3.88 |
| Overall Lens Length | 93.83 | 95.36 | 140.56 |
| BF | 10.73 | 18.99 | 16.11 |
| d5 | 0.78 | 16.76 | 62.40 |
| d11 | 32.19 | 12.78 | 0.84 |
| d12 | 12.02 | 5.16 | −0.50 |

-continued

| | | | |
|---|---|---|---|
| d22 | 1.90 | 6.25 | 3.74 |
| d24 | 3.60 | 2.81 | 25.35 |
| d27 | 9.20 | 17.46 | 14.58 |

Zoom Lens Unit Data

| Unit No. | Front Surface | Focal Length |
|---|---|---|
| 1 | 1 | 79.98 |
| 2 | 6 | −9.17 |
| 3 | 13 | 23.26 |
| 4 | 23 | 205.38 |
| 5 | 25 | 34.74 |

SEVENTH NUMERICAL EXAMPLE

Surface Data

| Surface Number | r | d | nd | vd |
|---|---|---|---|---|
| 1 | 110.420 | 0.50 | 1.88300 | 40.8 |
| 2 | 49.370 | 6.95 | 1.59282 | 68.6 |
| 3 | −1197.279 | 0.18 | | |
| 4 | 46.135 | 4.25 | 1.43875 | 94.9 |
| 5 | 219.343 | (variable) | | |
| 6* | 3857.846 | 0.50 | 1.88300 | 40.8 |
| 7* | 8.384 | 5.38 | | |
| 8 | −37.530 | 0.50 | 1.77250 | 49.6 |
| 9 | 26.886 | 0.20 | | |
| 10 | 18.126 | 2.00 | 2.00178 | 19.3 |
| 11 | 104.140 | (variable) | | |
| 12 (stop) | ∞ | (variable) | | |
| 13* | 10.094 | 3.00 | 1.55332 | 71.7 |
| 14* | −75.681 | 1.46 | | |
| 15 | 26.802 | 0.50 | 1.64769 | 33.8 |
| 16 | 10.724 | 0.37 | | |
| 17 | 13.612 | 0.50 | 1.74320 | 49.3 |
| 18 | 7.503 | 3.45 | 1.45600 | 90.3 |
| 19* | −36.264 | (variable) | | |
| 20 | 51.283 | 0.50 | 1.51633 | 64.1 |
| 21 | 16.483 | (variable) | | |
| 22 | 24.725 | 2.40 | 1.78590 | 44.2 |
| 23 | −29.675 | 0.50 | 1.92286 | 18.9 |
| 24 | −86.407 | (variable) | | |
| 25 | ∞ | 0.50 | 1.51633 | 64.1 |
| 26 | ∞ | 0.50 | | |
| image plane | ∞ | | | |

Aspherical Surface Data

6th surface

K = 9.27342e+004  A4 = 3.81002e−005  A6 = −3.08623e−007
A8 = 9.42749e−010

7th surface

K = −1.01331e−001  A4 = 2.19036e−005  A6 = 1.40543e−006
A8 = −2.72919e−008

13th surface

K = −8.51411e−002  A4 = −1.17522e−004  A6 = −1.30376e−007
A8 = −2.15967e−008  A10 = 2.62605e−010

14th surface

K = −3.49998e+001  A4 = −2.57554e−005  A6 = −4.66479e−007

19th surface

K = −1.12299e+000  A4 = 1.68053e−006  A6 = 6.56435e−007
A8 = 1.63883e−009

-continued

Various Data
Zoom Ratio 94.44

| | Wide Angle | Intermediate | Telephoto |
|---|---|---|---|
| Focal Length | 3.60 | 14.51 | 340.00 |
| F-number | 3.50 | 5.00 | 9.00 |
| Field Angle | 42.12 | 14.95 | 0.65 |
| Image Height | 3.25 | 3.88 | 3.88 |
| Overall Lens Length | 96.08 | 97.57 | 165.58 |
| BF | 10.48 | 21.86 | 2.28 |
| d5 | 0.50 | 20.50 | 79.15 |
| d11 | 29.12 | 9.42 | 1.17 |
| d12 | 17.55 | 2.60 | 0.00 |
| d19 | 2.28 | 2.57 | 11.94 |
| d21 | 2.85 | 7.32 | 37.74 |
| d24 | 9.65 | 21.03 | 1.45 |

Zoom Lens Unit Data

| Unit No. | Front Surface | Focal Length |
|---|---|---|
| 1 | 1 | 98.89 |
| 2 | 6 | −9.14 |
| 3 | 13 | 18.17 |
| 4 | 20 | −47.27 |
| 5 | 22 | 26.66 |

EIGHTH NUMERICAL EXAMPLE

Surface Data

| Surface Number | r | d | nd | vd |
|---|---|---|---|---|
| 1 | 102.198 | 1.65 | 1.80610 | 33.3 |
| 2 | 43.523 | 4.27 | 1.49700 | 81.5 |
| 3 | −479.207 | 0.18 | | |
| 4 | 43.250 | 3.23 | 1.60311 | 60.6 |
| 5 | 269.552 | (variable) | | |
| 6 | 148.149 | 0.85 | 1.88300 | 40.8 |
| 7 | 8.622 | 4.51 | | |
| 8 | −30.162 | 0.70 | 1.77250 | 49.6 |
| 9 | 29.416 | 0.20 | | |
| 10 | 17.772 | 2.04 | 1.92286 | 18.9 |
| 11 | 153.705 | (variable) | | |
| 12 (stop) | ∞ | (variable) | | |
| 13* | 9.420 | 2.77 | 1.55332 | 71.7 |
| 14* | −114.449 | 1.96 | | |
| 15 | 47.072 | 0.60 | 1.64769 | 33.8 |
| 16 | 9.324 | 0.35 | | |
| 17 | 14.499 | 0.70 | 1.84666 | 23.9 |
| 18 | 11.939 | 1.88 | 1.51633 | 64.1 |
| 19 | −21.144 | 0.30 | | |
| 20 | ∞ | (variable) | | |
| 21 | 74.328 | 0.70 | 1.48749 | 70.2 |
| 22 | 13.662 | (variable) | | |
| 23 | 17.336 | 2.09 | 1.83481 | 42.7 |
| 24 | −66.281 | 0.60 | 1.94595 | 18.0 |
| 25 | 112.658 | (variable) | | |
| 26 | ∞ | 0.80 | 1.51633 | 64.1 |
| 27 | ∞ | 1.00 | | |
| image plane | ∞ | | | |

Aspherical Surface Data

13th surface

K = −2.35062e−001  A4 = −2.53973e−005  A6 = 1.44411e−007
A8 = 3.99784e−009  A10 = 2.62605e−010

14th surface

K = −1.15907e+002  A4 = 1.05998e−004  A6 = 2.39812e−007

-continued

Various Data
Zoom Ratio 31.67

|  | Wide Angle | Intermediate | Telephoto |
|---|---|---|---|
| Focal Length | 4.42 | 13.40 | 140.00 |
| F-number | 3.50 | 4.20 | 5.98 |
| Field Angle | 37.01 | 16.13 | 1.59 |
| Image Height | 3.33 | 3.88 | 3.88 |
| Overall Lens Length | 85.44 | 80.40 | 120.55 |
| BF | 9.75 | 15.41 | 7.61 |
| d5 | 0.78 | 11.82 | 54.64 |
| d11 | 29.21 | 12.36 | 0.99 |
| d12 | 10.34 | 0.99 | 0.45 |
| d20 | 2.18 | 5.53 | 7.62 |
| d22 | 3.32 | 4.42 | 19.39 |
| d25 | 8.22 | 13.88 | 6.08 |

Zoom Lens Unit Data

| Unit No. | Front Surface | Focal Length |
|---|---|---|
| 1 | 1 | 73.93 |
| 2 | 6 | −9.74 |
| 3 | 13 | 16.31 |
| 4 | 21 | −34.47 |
| 5 | 23 | 25.80 |

TABLE 1

| | Conditional Expression | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|---|
| (1) | $Dt23/\sqrt{(fw * ft)}$ | 0.046 | 0.061 | 0.085 | 0.036 | 0.080 | 0.012 | 0.034 | 0.058 |
| (2) | $|f2|/ft$ | 0.04 | 0.08 | 0.09 | 0.05 | 0.06 | 0.05 | 0.03 | 0.07 |
| (3) | $M2/|f2|$ | −2.07 | −2.27 | −3.13 | −3.39 | −1.10 | −1.62 | −1.00 | −1.93 |
| (4) | $\beta 2t/\beta 2w$ | 15.03 | 8.81 | 6.77 | 15.89 | 9.58 | 14.14 | 15.21 | 10.16 |
| (5) | $Tsum/ft$ | 0.15 | 0.25 | 0.37 | 0.22 | 0.22 | 0.17 | 0.10 | 0.21 |
| (6) | $|f2|/f3$ | 0.48 | 0.64 | 0.48 | 0.47 | 0.50 | 0.39 | 0.50 | 0.60 |
| (7) | $f1/fw$ | 18.18 | 17.43 | 12.24 | 20.74 | 23.99 | 18.59 | 27.47 | 16.72 |
| (8) | $M1/fw$ | 9.40 | 7.69 | 6.62 | 8.77 | 15.56 | 10.86 | 19.31 | 7.94 |
| (9) | $f3/ft$ | 0.09 | 0.12 | 0.20 | 0.11 | 0.12 | 0.12 | 0.05 | 0.12 |
| (10) | $ft/fw$ | 47.51 | 28.51 | 18.90 | 41.67 | 38.68 | 43.46 | 94.44 | 31.67 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-058490, filed Mar. 15, 2012, which is hereby incorporated by reference herein in its entirety.

What is claimed is:

1. A zoom lens comprising, in order from an object side to an image side:
    a first lens unit having a positive refractive power;
    a second lens unit having a negative refractive power;
    a third lens unit having a positive refractive power; and
    a rear lens group including one or more lens units,
    wherein the first lens unit is closer to the object side at a telephoto end than at a wide angle end and the second lens unit is closer to the image side at the telephoto end than at the wide angle end, and
    wherein, when Dt23 is a distance between the second lens unit and the third lens unit at the telephoto end, fw and ft are focal lengths of the entire zoom lens at the wide angle end and the telephoto end, respectively, f2 is a focal length of the second lens unit, and M2 is an amount of movement of the second lens unit in an optical axis direction during zooming from the wide angle end to the telephoto end, the following conditional expressions are satisfied:

$Dt23/\sqrt{fw*ft}<0.09$, $0.01<|f2|/ft<0.10$, and $-5.00<M2/|f2|<-0.70$.

2. The zoom lens according to claim 1, wherein, when β2w is a lateral magnification of the second lens unit at the wide angle end and β2t is a lateral magnification of the second lens unit at the telephoto end, the following conditional expression is satisfied:

$5.00<\beta 2t/\beta 2w<20.00$.

3. The zoom lens according to claim 1, wherein, when Tsum is a total thickness of the lens unit, the second less unit, and the rear lens group included in the entire zoom lens, the following conditional expression is satisfied:

$Tsum/ft<0.50$.

4. The zoom lens according to claim 1, wherein, when f3 is a focal length of the third lens unit, the following conditional expression is satisfied:

$0.30<|f2|/f3<0.80$.

5. The zoom lens according to claim 1, wherein, when f1 is a focal length of the first lens unit, the following conditional expression is satisfied:

$8.00<f1/fw<35.00$.

6. The zoom lens according to claim 1, wherein, when M1 is an amount of movement of the first lens unit in the optical axis direction during zooming from the wide angle end to the telephoto end, the following conditional expression is satisfied:

$5.00<M1/fw<25.00$.

7. The zoom lens according to claim 1, wherein, when f3 is a focal length of the third lens unit, the following conditional expression is satisfied:

$0.01<f3/ft<0.25$.

8. The zoom lens according to claim 1, wherein the following conditional expression is satisfied:

$15.00<ft/fw<120.00$.

9. The zoom lens according to claim 1, wherein the first lens unit includes, in order from the object side to the image side, a negative lens, a positive lens, and a positive lens.

10. The zoom lens according to claim 1, wherein the rear lens group includes, in order from the object side to the image side, a fourth lens unit having a negative refractive power and a fifth lens unit having a positive refractive power, and the fourth lens unit and the fifth lens unit are moved during zooming.

11. The zoom lens according to claim 1, wherein the rear lens group includes a fourth lens unit having a positive refractive power, and the fourth lens unit is moved during zooming.

12. The zoom lens according to claim 1, wherein the rear lens group includes, in order from the object side to the image side, a fourth lens unit having a positive refractive power and a fifth lens unit having a positive refractive power, and the fourth lens unit and the fifth lens unit are moved during zooming.

13. The zoom lens according to claim 1, wherein the zoom lens forms an image on a solid-state image pickup device.

14. An image pickup apparatus, comprising:
the zoom lens according to claim 1; and
a solid-state image pickup device which receives an image formed by the zoom lens.

\* \* \* \* \*